US012697997B2

(12) United States Patent
Kondo

(10) Patent No.: US 12,697,997 B2
(45) Date of Patent: Aug. 4, 2026

(54) SERVER AND OPERATION SYSTEM

(71) Applicant: TOYOTA JIDOSHA KABUSHIKI KAISHA, Toyota (JP)

(72) Inventor: Kenji Kondo, Setagaya-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/538,272

(22) Filed: Dec. 13, 2023

(65) Prior Publication Data

US 2024/0246561 A1     Jul. 25, 2024

(30) Foreign Application Priority Data

Jan. 23, 2023     (JP) ................................. 2023-008142

(51) Int. Cl.
*B60W 60/00*          (2020.01)
(52) U.S. Cl.
CPC ....... *B60W 60/001* (2020.02); *B60W 2556/45* (2020.02)
(58) Field of Classification Search
CPC . B60W 60/001; B60W 2556/45; G01C 21/34; G06Q 10/02; G06Q 10/047; G06Q 10/063; G06Q 50/40; G08G 1/005; G08G 1/202; G08G 1/205; H04W 74/08; H04W 4/40
See application file for complete search history.

(56) References Cited

U.S. PATENT DOCUMENTS

| | | | |
|---|---|---|---|
| 2012/0022904 A1* | 1/2012 | Mason ............. | G06Q 10/06311 705/333 |
| 2015/0339928 A1* | 11/2015 | Ramanujam ........... | G06Q 10/00 701/23 |
| 2017/0267233 A1* | 9/2017 | Minster ................. | B60W 30/06 |
| 2018/0341880 A1* | 11/2018 | Kislovskiy ............. | G06Q 10/02 |
| 2020/0158525 A1* | 5/2020 | Rakah .................... | G08G 1/202 |
| 2020/0193835 A1* | 6/2020 | Kamata .................. | G08G 1/127 |
| 2022/0163969 A1* | 5/2022 | Li ..................... | G08G 1/096811 |
| 2023/0362581 A1* | 11/2023 | Brooks ................. | H04W 4/021 |
| 2024/0004401 A1* | 1/2024 | Fukunaga .............. | G01C 21/34 |
| 2025/0282389 A1* | 9/2025 | Raphael ............. | G01C 21/3492 |

FOREIGN PATENT DOCUMENTS

| | | |
|---|---|---|
| JP | H07-219633 A | 8/1995 |
| JP | 2013-186541 A | 9/2013 |

* cited by examiner

*Primary Examiner* — Erin M Piateski
*Assistant Examiner* — Eisen Yim
(74) *Attorney, Agent, or Firm* — Dinsmore & Shohl LLP

(57) ABSTRACT

A server that manages a plurality of movable bodies generates an operation plan of each of the plurality of movable bodies and instructs each of the plurality of movable bodies to operate in accordance with the generated operation plan. The server is configured to perform determining, before it instructs each of the plurality of movable bodies to operate, whether or not contention will occur, the contention referring to a plurality of movable bodies standing by at a same stand-by point at the same timing if the server instructs each of the plurality of movable bodies to operate in accordance with the operation plan, and modifying the operation plan of at least one of a plurality of contending movable bodies to avoid the contention when it determines that the contention will occur.

9 Claims, 10 Drawing Sheets

| VEHICLE ID | CURRENT | SERVICE SECTION | | | | NON-SERVICE SECTION | .... |
| | | TASK | START | MOVEMENT | END | STAND-BY LOCATION AND MOVEMENT CONDITION | |
| --- | --- | --- | --- | --- | --- | --- | --- |
| ID-** | **** | ** | ** | ** | ** | **** | .... |
| ID-** | **** | ** | ** | ** | ** | **** | .... |
| ⋮ | ⋮ | ⋮ | ⋮ | ⋮ | ⋮ | ⋮ | .... |

Figure 4:
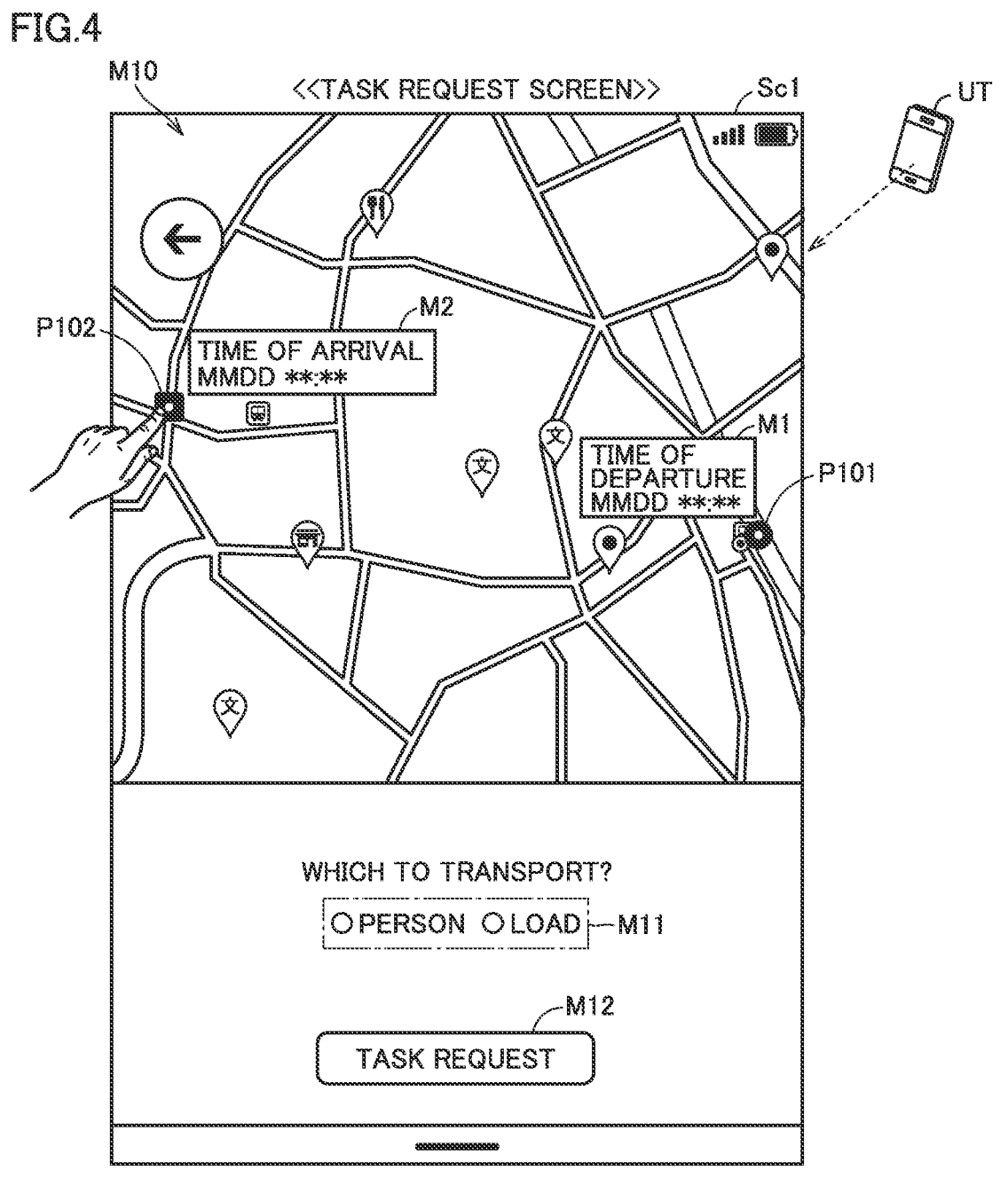

<<TASK REQUEST SCREEN>>          Sc1        UT

P102

TIME OF ARRIVAL
MMDD :

M2

M1

TIME OF
DEPARTURE
MMDD :

P101

WHICH TO TRANSPORT?

○ PERSON  ○ LOAD —M11

—M12

TASK REQUEST

<SERVER>

START ◄——— PRESCRIBED TIME ON THE DAY HAS COME

S11

OBTAIN OPERATION PLAN OF EACH VEHICLE AND VEHICLE STATUS AND OPERATION STATUS ON THE DAY

S12

CONTENTION AT STAND-BY POINT? — YES

NO

S13

FINALIZE OPERATION PLAN

S14

MODIFY OPERATION PLAN

AVOID CONTENTION WITH ONE OF TECHNIQUES A TO E IN CONSIDERATION OF ENERGY EFFICIENCY

S15

OPERATION INSTRUCTION

END

SERVER AND OPERATION SYSTEM

CROSS REFERENCE TO RELATED APPLICATIONS

This nonprovisional application is based on Japanese Patent Application No. 2023-008142 filed with the Japan Patent Office on Jan. 23, 2023, the entire contents of which are hereby incorporated by reference.

BACKGROUND

Field

The present disclosure relates to a server and an operation system.

Description of the Background Art

Japanese Patent Laying-Open No. 2013-186541 discloses an on-demand vehicle operation system that creates an operation plan of a share-ride vehicle based on a request relating to getting on and off of a user and has the shared-ride vehicle travel in accordance with this operation plan.

SUMMARY

The operation system described in Japanese Patent Laying-Open No. 2013-186541 obtains a getting-on/off point desired by the user in connection with the operation plan and seat availability presented by information presentation means, for example, for an on-demand bus, and modifies the operation plan based on this getting-on/off point. The number of remaining seats of the on-demand bus can thus be minimized and operation efficiency of the on-demand bus can be enhanced.

In a technology described in Japanese Patent Laying-Open No. 2013-186541, operation efficiency is enhanced by increasing a service section in the operation plan or by increasing an amount of task in the service section. In Japanese Patent Laying-Open No. 2013-186541, transport of a person corresponds to the task and an amount of transport (that is, the number of persons) corresponds to the amount of task. The service section corresponds to a section in the operation plan in which a movable body (for example, a bus described in Japanese Patent Laying-Open No. 2013-186541) works for the task. The service section includes a section toward a task start point (for example, a getting-on point) for the movable body to perform the requested task and a section from the task start point to a task end point.

Japanese Patent Laying-Open No. 2013-186541, however, is silent about relation between operation efficiency and an operation resource. The operation efficiency can be expressed by a value (=an amount of task/an amount of operation resource) calculated by dividing the amount of task by the amount of operation resource. The operation resource refers to a resource necessary for operation.

Examples of the operation resource include not only the movable body but also energy for working of the movable body, an energy replenishment point, and the like. As there are more operation resources, the operation efficiency is lower. Therefore, the technology described in Japanese Patent Laying-Open No. 2013-186541 does not necessarily achieve sufficient operation efficiency. There is a room for improvement in the technology described in Japanese Patent Laying-Open No. 2013-186541.

The present disclosure was made to solve the problem above, and an object thereof is to facilitate enhancement of operation efficiency while increase in amount of operation resource is suppressed.

According to a form according to a first point of view of the present disclosure, a server shown below is provided.

(Clause 1) The server is configured to manage a plurality of movable bodies. The server is configured to generate an operation plan of each of the plurality of movable bodies and to instruct each of the plurality of movable bodies to operate in accordance with the generated operation plan. The operation plan includes a stand-by point where a movable body of the plurality of movable bodies stands by after the movable body performs a requested task and a stand-by period at the stand-by point. The server is configured to determine, before the server instructs each of the plurality of movable bodies to operate, whether contention will occur, the contention referring to the plurality of movable bodies standing by at an identical stand-by point at identical timing if the server instructs each of the plurality of movable bodies to operate in accordance with the operation plan, and to modify the operation plan of at least one of contending movable bodies of the plurality of movable bodies to avoid the contention when the server determines that the contention will occur.

Return of the movable body to an initial point (a location where the movable body was stored) each time the movable body finishes the task is inefficient in terms of both of time and energy. In order for the movable body to efficiently perform a plurality of tasks, the movable body desirably stands by at a prescribed stand-by point in a non-service section (that is, a section from completion of one task until start of movement for a next task) in an operation plan and heads for a next task start point from the stand-by point. The stand-by point is one of operation resources. Increase in stand-by points facilitates increase in amount of task. Excessive increase in stand-by points, however, leads to poorer operation efficiency due to increase in stand-by points, rather than improvement in operation efficiency owing to increase in amount of task, which conversely results in poorer operation efficiency. In particular, increase in stand-by points in an area high in land price (for example, an urban area) leads to poorer operation efficiency (=amount of task/price of operation resource) from an economical point of view. Therefore, in order to enhance the operation efficiency, a plurality of movable bodies desirably make effective use of limited stand-by points.

In an operation system including few available stand-by points, however, contention between a plurality of movable bodies at a stand-by point (that is, stand-by by a plurality of movable bodies at the same stand-by point at the same timing) is likely. Even when the operation plan of each of the plurality of movable bodies is set to avoid contention, depending on a condition on a day (the day) when the operation plan is executed, contention may occur. In this regard, the server determines, before it instructs each of the plurality of movable bodies to operate, whether or not contention will occur if it instructs each of the plurality of movable bodies to operate in accordance with the operation plan. When the server determines that the contention will occur, the server modifies the operation plan of at least one of the plurality of contending movable bodies to avoid contention. Therefore, the server can determine the operation plan to avoid contention, for example, depending on a condition on the day. The plurality of movable bodies can thus make effective use of the limited stand-by points. The server thus causes the plurality of movable bodies to operate in coordination in the non-service section so as to facilitate enhancement of operation efficiency. According to the server, enhancement of the operation efficiency is facilitated while increase in amount of operation resources is suppressed.

The movable body may be an electrically powered vehicle (which is also refereed to as an "xEV" below) that uses electric power as the entirety or a part of a motive power source or an internal combustion vehicle. Examples of the xEV include a battery electric vehicle (BEV), a plug-in hybrid electric vehicle (PHEV), a hybrid electric vehicle (HEV), and a fuel cell electric vehicle (FCEV).

The server according to Clause 1 may be configured according to any one of Clauses 2 to 7 shown below.

(Clause 2) The server according to Clause 1 is configured to change the stand-by point to avoid the contention in the operation plan of at least one of the contending movable bodies.

(Clause 3) The server according to Clause 1 or 2 further includes a feature below. Each of the plurality of movable bodies is an automated-driving vehicle. The operation plan further includes a path and a travel condition for movement of the automated-driving vehicle to the stand-by point after end of the task. The server is configured to, in response to determination that a first movable body and a second movable body of the plurality of movable bodies will contend at the stand-by point, delay in the operation plan of the second movable body, stand-by start time indicated by the stand-by period at the stand-by point to avoid the contention by changing the travel condition without changing the path, the second movable body being later in the stand-by start time than the first movable body.

(Clause 4) The server according to any one of Clauses 1 to 3 further includes a feature below. Each of the plurality of movable bodies is an automated-driving vehicle. The operation plan further includes a path for movement of the automated-driving vehicle to the stand-by point after end of the task. The server is configured to, in response to determination that a first movable body and a second movable body of the plurality of movable bodies will contend at the stand-by point, delay in the operation plan of the second movable body, stand-by start time indicated by the stand-by period at the stand-by point to avoid the contention by changing the path to a detour path, the second movable body being later in the stand-by start time than the first movable body.

(Clause 5) The server according to any one of Clauses 1 to 4 further includes a feature below. Each of the plurality of movable bodies is an automated-driving vehicle. The operation plan further includes a path for movement of the automated-driving vehicle to the stand-by point after end of the task. The server is configured to, in response to determination that a first movable body and a second movable body of the plurality of movable bodies will contend at the stand-by point, delay in the operation plan of the second movable body, stand-by start time indicated by the stand-by period at the stand-by point to avoid the contention by changing the path to include a loop path including a prescribed number of laps, the second movable body being later in the stand-by start time than the first movable body.

According to the configuration according to any one of Clauses 2 to 5, contention can more readily appropriately be avoided. A travel condition is accurately controlled more readily in automated driving than in manual driving by a driver.

(Clause 6) The server according to any one of Clauses 1 to 5 is configured to select, where there are a plurality of operation plans that allow avoidance of the contention, an operation plan highest in energy efficiency from among the plurality of operation plans.

According to the configuration, operation efficiency is more readily enhanced while increase in energy for working of the movable body is suppressed. The server may change an arbitration protocol for avoiding contention in order to enhance energy efficiency.

(Clause 7) The server according to any one of Clauses 1 to 6 is configured to modify, when the server determines that the contention between a first movable body and a second movable body included in the plurality of movable bodies will occur, the operation plan of at least one of the first movable body and the second movable body such that the first movable body and the second movable body are replaced with each other at the stand-by point.

According to the configuration, the first movable body and the second movable body are replaced with each other at the stand-by point. A preceding movable body and a subsequent movable body are replaced with each other at the stand-by point (a stand-by space is not freed) so that occupation by another movable body (for example, a third movable body irrelevant to the operation plan) after the preceding movable body leaves the stand-by point (stand-by space) (that is, unavailability of the stand-by space to the subsequent movable body) can be suppressed. Regardless of whether or not the third movable body has the right to use the stand-by space, if the space is free, the third movable body may use the space.

According to a form according to a second point of view of the present disclosure, an operation system shown below is provided.

(Clause 8) The operation system includes the server according to any one of Clause 1 to 7 and the plurality of movable bodies that receive an instruction from the server.

In the operation system, with the server described previously, operation efficiency is more readily enhanced while increase in amount of operation resources is suppressed.

(Clause 9) The operation system according to Clause 8 further includes a feature below. The plurality of movable bodies include a first movable body and a second movable body. In response to an instruction to operate in accordance with the operation plan including scheduled replacement between the first movable body and the second movable body at the stand-by point, the first movable body departs from the stand-by point when the second movable body approaches while the first movable body stands by at the stand-by point.

According to the configuration, at the timing when the first movable body leaves the stand-by point, the second movable body is allowed to readily enter the stand-by point.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram showing a task request screen adopted in the operation system according to the embodiment of the present disclosure.

DESCRIPTION OF THE EMBODIMENTS

Figure 1:
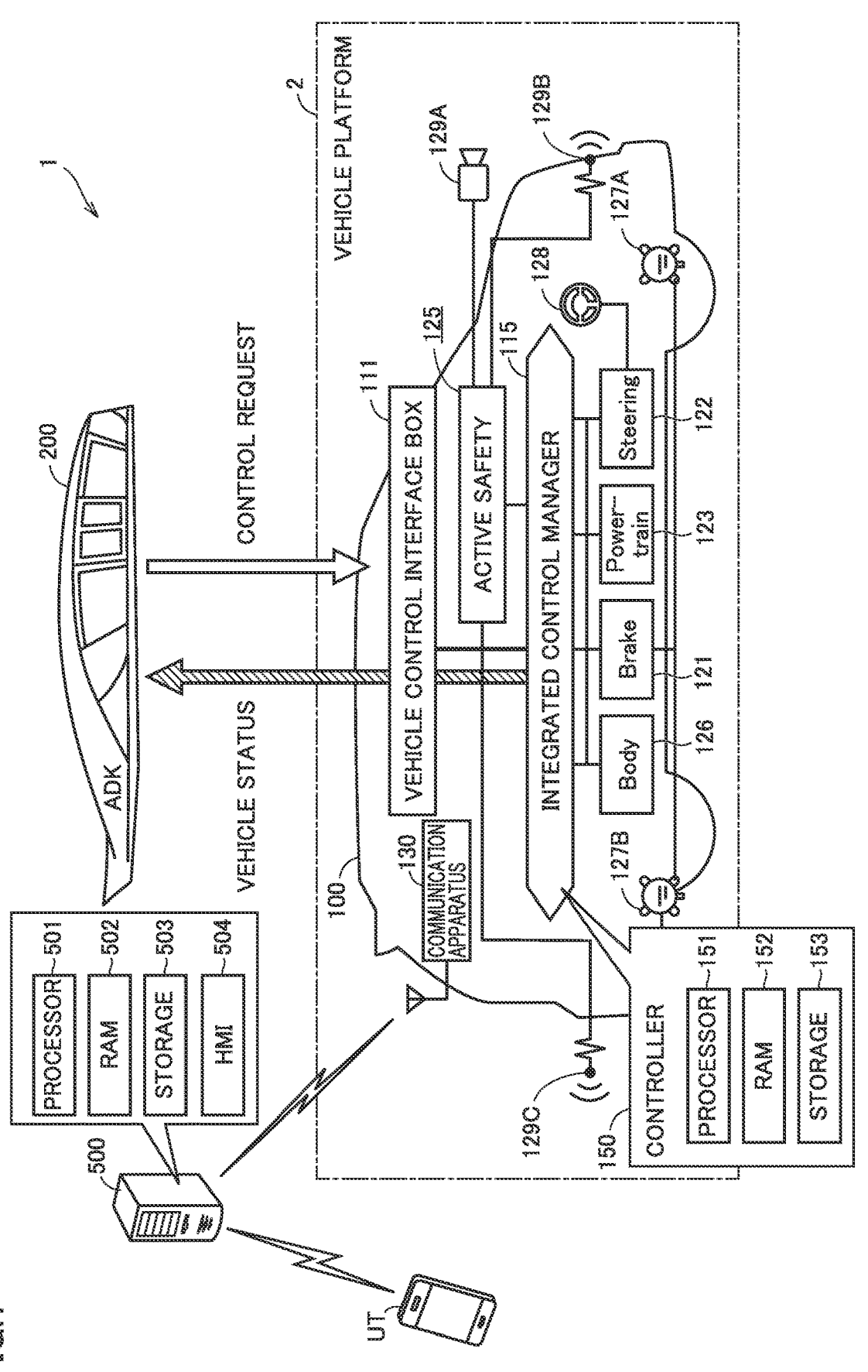
FIG. 1 is a diagram showing an overall configuration of a vehicle according to an embodiment of the present disclosure.

An embodiment of the present disclosure will be described below in detail with reference to the drawings. The same or corresponding elements in the drawings have the same reference characters allotted and description thereof will not be repeated.

FIG. 1 is a diagram showing an overall configuration of a vehicle according to an embodiment of the present disclosure. Referring to FIG. 1, a vehicle 1 includes an autonomous driving kit (which is denoted as "ADK" below) 200 and a vehicle platform (which is denoted as "VP" below) 2.

VP 2 includes a control system for a base vehicle 100 and a vehicle control interface box (which is denoted as "VCIB" below) 111 provided in base vehicle 100. VCIB 111 may communicate with ADK 200 over an in-vehicle network such as controller area network (CAN). Though FIG. 1 shows base vehicle 100 and ADK 200 at positions distant from each other, ADK 200 is actually attached to base vehicle 100.

In this embodiment, ADK 200 is attached to a rooftop of base vehicle 100. A position of attachment of ADK 200 can be modified as appropriate. Base vehicle 100 is, for example, a commercially available xEV (electrically powered vehicle). In this embodiment, a battery electric vehicle (BEV) is adopted as base vehicle 100. Without being limited thereto, base vehicle 100 may be an xEV (an HEV, a PHEV, an FCEV, or the like) other than the BEV. Base vehicle 100 may include, for example, four wheels. Without being limited as such, three wheels or five or more wheels may be provided.

The control system for base vehicle 100 includes various systems and various sensors for control of base vehicle 100, in addition to an integrated control manager 115. Integrated control manager 115 integrally controls the various systems involved with operations of base vehicle 100 based on signals from the various sensors (sensor detection signals) included in base vehicle 100.

In this embodiment, integrated control manager 115 includes a controller 150. Controller 150 includes a processor 151, a random access memory (RAM) 152, and a storage 153. For example, a central processing unit (CPU) can be adopted as processor 151. RAM 152 functions as a work memory where data processed by processor 151 is temporarily stored. Storage 153 is configured such that information put thereinto can be stored therein. Storage 153 may include a read only memory (ROM) and a rewritable non-volatile memory. Not only a program but also information (for example, a map, a mathematical expression, and various parameters) used in the program are stored in storage 153. In this embodiment, various types of vehicle control (for example, automated driving control in accordance with an instruction from ADK 200) are carried out by execution by processor 151, of the program stored in storage 153. The processing, however, may be performed by dedicated hardware (electronic circuitry) rather than software. Controller 150 may include any number of processors, and a processor may be prepared for each prescribed control.

Base vehicle 100 includes a brake system 121, a steering system 122, a powertrain system 123, an active safety system 125, and a body system 126. These systems are integrally controlled by integrated control manager 115. In this embodiment, each system includes a computer. The computer for each system communicates with integrated control manager 115 over the in-vehicle network (for example, CAN). The computer included in each system is referred to as an electronic control unit (ECU) below.

Brake system 121 includes a braking apparatus provided in each wheel of base vehicle 100 and an ECU that controls the braking apparatus. In this embodiment, a hydraulic disc brake apparatus is adopted as the braking apparatus. Base vehicle 100 includes wheel speed sensors 127A and 127B. Wheel speed sensor 127A is provided in a front wheel of base vehicle 100 and detects a rotation speed of the front wheel. Wheel speed sensor 127B is provided in a rear wheel of base vehicle 100 and detects a rotation speed of the rear wheel. The ECU of brake system 121 outputs directions of rotation and rotation speeds of the wheels detected by wheel speed sensors 127A and 127B to integrated control manager 115. Integrated control manager 115 may obtain a travel speed (vehicle speed) of vehicle 1 based on detection signals from wheel speed sensors 127A and 127B.

Steering system 122 includes a steering apparatus of base vehicle 100 and an ECU that controls the steering apparatus. The steering apparatus includes, for example, rack-and-pinion electric power steering (EPS), an angle of steering of which can be adjusted by an actuator. Base vehicle 100 includes a pinion angle sensor 128. Pinion angle sensor 128 detects an angle of rotation (pinion angle) of a pinion gear coupled to a rotation shaft of the actuator included in the steering apparatus. The ECU of steering system 122 outputs the pinion angle detected by pinion angle sensor 128 to integrated control manager 115.

Powertrain system 123 includes an electric parking brake (EPB) provided in at least one of wheels included in base vehicle 100, a P-Lock apparatus provided in a transmission of base vehicle 100, a shift apparatus configured to allow selection of a shift range, a drive source of base vehicle 100, and an ECU that controls each apparatus included in powertrain system 123. The EPB is provided separately from the braking apparatus described previously, and it immobilizes the wheel with an electric actuator. The P-Lock apparatus mechanically immobilizes a rotation position of an output shaft of the transmission, for example, with a parking lock pawl that can be driven by an actuator. Though details will be described later, in this embodiment, a motor supplied with electric power from a battery is adopted as the drive source of base vehicle 100. The ECU of powertrain system 123 outputs whether or not immobilization by each of the EPB and the P-Lock apparatus has been achieved, the shift range selected with the shift apparatus, and a status of each of the battery and the motor (see FIG. 3 which will be described later) to integrated control manager 115.

Active safety system 125 includes an ECU that determines possibility of collision of traveling vehicle 1. Base vehicle 100 includes a camera 129A and radar sensors 129B and 129C that detect a state of surroundings including the front and the rear of vehicle 1. The ECU of active safety system 125 determines whether or not there is possibility of collision based on signals received from camera 129A and radar sensors 129B and 129C. When active safety system 125 determines that there is possibility of collision, integrated control manager 115 outputs a braking command to brake system 121 to increase braking force of vehicle 1. Base vehicle 100 according to this embodiment includes active safety system 125 from the beginning (shipment). Without being limited as such, an active safety system that can subsequently be attached to the base vehicle may be adopted.

Body system 126 includes body-related components (for example, a direction indicator, a horn, and a wiper) and an ECU that controls the body-related components. In a manual mode, the ECU of body system 126 controls the body-related components in accordance with an operation by a user, and in an autonomous mode, the ECU controls the body-related components in accordance with a command received from ADK 200 through VCIB 111 and integrated control manager 115.

Vehicle 1 is configured to be capable of automated driving. VCIB 111 functions as a vehicle control interface. When vehicle 1 travels by automated driving, integrated control manager 115 and ADK 200 exchange signals with each other through VCIB 111 and integrated control manager 115 carries out travel control (that is, automated driving control) in the autonomous mode in accordance with a command from ADK 200. ADK 200 is also removable from base vehicle 100. Even while ADK 200 is not attached, base vehicle 100 alone can travel by being driven by the user. When base vehicle 10 alone travels, the control system for base vehicle 100 carries out travel control in the manual mode (that is, travel control in accordance with an operation by the user). Integrated control manager 115 may switch between the autonomous mode and the manual mode in accordance with an instruction from a vehicle manager or a server 500.

In this embodiment, ADK 200 exchanges signals with VCIB 111 in accordance with an application program interface (API) that defines each communicated signal. ADK 200 is configured to process various signals defined by the API. ADK 200, for example, creates a driving plan of vehicle 1 and outputs to VCIB 111 in accordance with the API, various commands that request control for travel of vehicle 1 in accordance with the created driving plan. Controller 150 of integrated control manager 115 sequentially transmits to ADK 200 through VCIB 111, various signals (for example, sensor signals or status signals) indicating statuses of base vehicle 100 detected in the control system for base vehicle 100. VCIB 111 allows integrated control manager 115 to control the vehicle in accordance with the command from ADK 200 by converting signals between ADK 200 and integrated control manager 115.

Base vehicle 100 further includes a communication apparatus 130. Communication apparatus 130 includes various communication interfaces (I/Fs). Controller 150 is configured to communicate with an apparatus (for example, server 500 which will be described later) on the outside of vehicle 1 through communication apparatus 130. Communication apparatus 130 includes a wireless communication instrument (for example, data communication module (DCM)) that can access a mobile communication network (telematics).

A mobile terminal UT is a terminal carried by a user who uses vehicle 1. In this embodiment, a smartphone equipped with a touch panel display is adopted as mobile terminal UT. Without being limited as such, any mobile terminal can be adopted as mobile terminal UT, and a laptop computer, a tablet terminal, a wearable device (a smartwatch or smart-glasses), an electronic key, or the like can also be adopted.

Vehicle 1 described above may be adopted as one of constituent elements of a mobility as a service (MaaS) system. The MaaS system includes, for example, a mobility service platform (MSPF). The MSPF is an integrated platform to which various mobility services (for example, various mobility services provided by a ride-share company, a car-sharing company, an insurance company, a rent-a-car company, and a taxi company) are connected. Server 500 is a computer that manages and publishes information for the mobility services on the MSPF. Server 500 manages information on various mobilities and provides information (for example, information on the API and coordination between mobilities) in response to a request from the companies. The companies that provide the services can use various functions provided by the MSPF by using APIs published on the MSPF. For example, the API necessary for development of the ADK is published on the MSPF.

Server 500 includes a processor 501, a RAM 502, a storage 503, and a human machine interface (HMI) 504. Storage 503 is configured such that information put thereinto can be stored therein. Not only a program but also information (for example, a map, a mathematical expression, and various parameters) used in the program are stored in storage 503. HMI 504 includes an input device and a display device. HMI 504 may be a touch panel display. HMI 504 may include a smart speaker that accepts an audio input.

Figure 2:
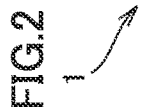
FIG. 2 is a diagram showing details of a control system for the vehicle shown in FIG. 1.

FIG. 2 is a diagram showing details of a control system for vehicle 1. Referring to FIG. 2 together with FIG. 1, ADK 200 includes an autonomous driving system (which is denoted as "ADS" below) 202 for automated driving of vehicle 1. ADS 202 includes a compute assembly 210, an HMI 230, sensors for perception 260, sensors for pose 270, and a sensor cleaning 290.

Compute assembly 210 includes a processor and a storage where automated driving software that uses the API is stored, and it is configured to execute the automated driving software with the processor. With the automated driving software, control relating to automated driving is carried out. The automated driving software may sequentially be updated by over the air (OTA). Compute assembly 210 further includes computing modules 210A and 210B.

HMI 230 is an apparatus for exchange of information between the user and compute assembly 210. HMI 230 includes an input device and a notification apparatus. The user can give an instruction or a request to compute assembly 210 through HMI 230 or change a value of a parameter (limited to a parameter change of which is permitted) used in the automated driving software. HMI 230 may be a touch panel display that performs functions of both of the input device and the notification apparatus.

Sensors for perception 260 include various sensors that obtain information (which is also referred to as "environmental information" below) for recognizing an environment outside vehicle 1. Sensors for perception 260 obtain the environmental information of vehicle 1 and outputs the environmental information to compute assembly 210. The environmental information is used for automated driving control. In this embodiment, sensors for perception 260 include a camera that picks up an image of surroundings (including the front and the rear) of vehicle 1 and an obstacle sensor (for example, a millimeter-wave radar and/or LIDAR) that senses an obstacle with electromagnetic waves or sound waves. Compute assembly 210 can recognize a person and an object (another vehicle, a post, a guardrail, or the like) present within a range recognizable by vehicle 1 and a line (for example, a centerline) on a road, for example, with the use of the environmental information received from sensors for perception 260. Artificial intelligence (AI) or a processor for image processing may be used for recognition.

Sensors for pose 270 obtain information on a pose of vehicle 1 (which is also referred to as "pose information" below) and outputs the information to compute assembly 210. Sensors for pose 270 include various sensors that detect an acceleration, an angular speed, and a position of vehicle 1. In this embodiment, sensors for pose 270 include an inertial measurement unit (IMU) and a positioning sensor. The IMU detects, an acceleration in each of a front-rear direction, a lateral direction, and a vertical direction of vehicle 1 and an angular speed in each of a roll direction, a pitch direction, and a yaw direction of vehicle 1. The positioning sensor detects a position of vehicle 1 with the use of a positioning system such as a global positioning system (GPS). In the field of automobiles and aircraft, a technology for highly accurate measurement of poses by combination of the IMU and the positioning sensor has been known. Compute assembly 210 may measure the pose of vehicle 1 based on the pose information, for example, with the use of such a known technology.

Sensor cleaning 290 is an apparatus that removes soiling of sensors (for example, sensors for perception 260) exposed to outside air on the outside of the vehicle. For example, sensor cleaning 290 may be configured to clean a lens of the camera and an emission port of the obstacle sensor with a cleaning solution or a wiper.

In vehicle 1, a prescribed function (for example, braking, steering, and vehicle immobilization) is redundant in order to improve safety. A control system 102 for base vehicle 100 includes a plurality of systems that perform equivalent functions. Specifically, brake system 121 includes brake systems 121A and 121B. Steering system 122 includes steering systems 122A and 122B. Powertrain system 123 includes an EPB system 123A and a P-Lock system 123B. Each system includes an ECU. Even when one of the plurality of systems that perform the equivalent functions malfunctions, so long as the other thereof normally operates, the function is normally performed in vehicle 1.

VCIB 111 includes a VCIB 111A and a VCIB 111B. Each of VCIBs 111A and 111B includes a computer. Computing modules 210A and 210B of compute assembly 210 are configured to communicate with respective computers of VCIBs 111A and 111B. VCIB 111A and VCIB 111B are communicatively connected to each other. Each of VCIBs 111A and 111B is operable alone, and even when one of them malfunctions, so long as the other thereof normally operates, VCIB 111 normally operates. Both of VCIBs 111A and 111B are connected to the systems with integrated control manager 115 being interposed. As shown in FIG. 2, however, VCIB 111A and VCIB 111B are partially different from each other in systems connected thereto.

In this embodiment, the function to accelerate vehicle 1 is not redundant. Powertrain system 123 includes a propulsion system 123C as a system that accelerates vehicle 1.

Figure 3:
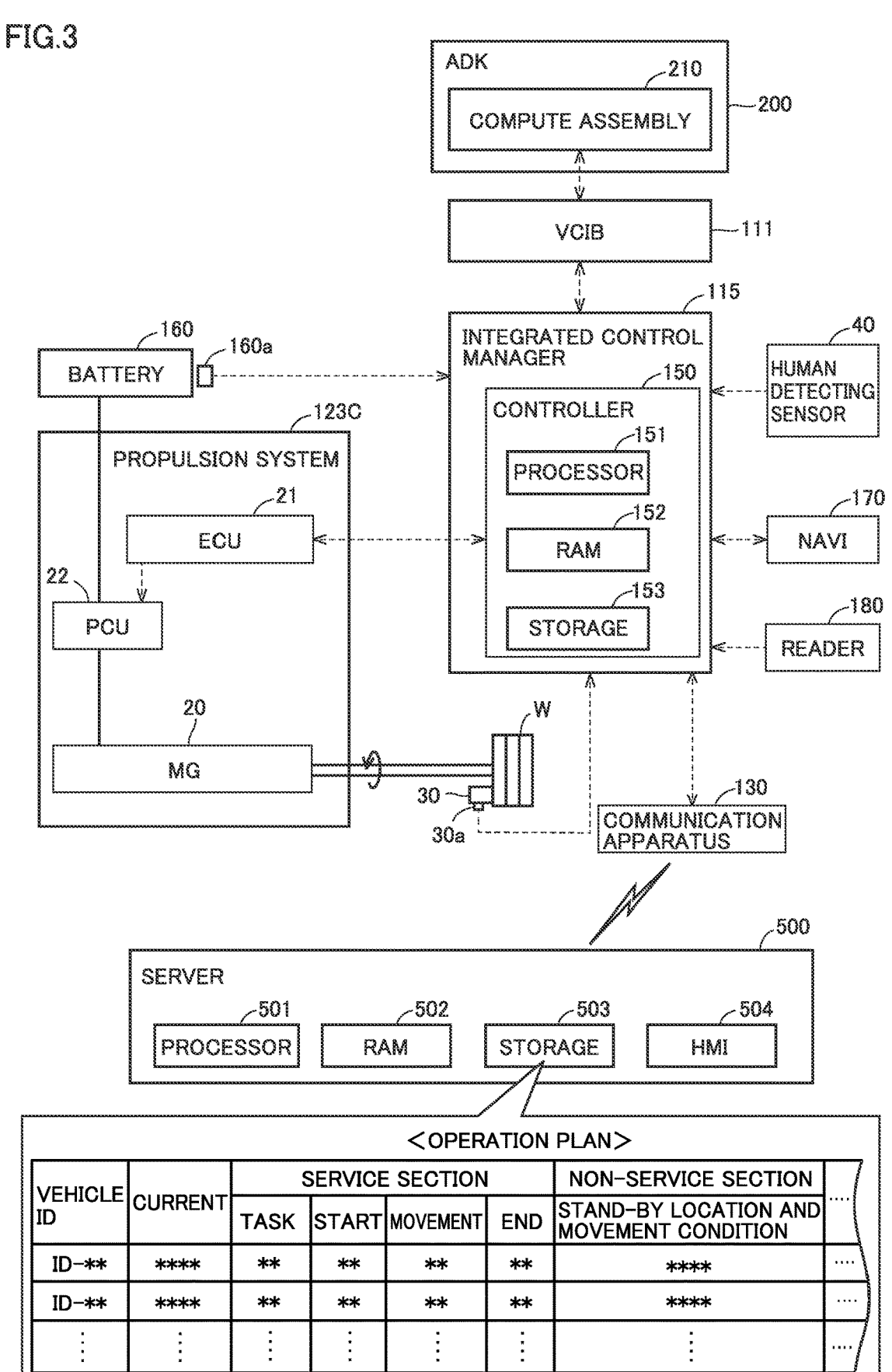
FIG. 3 is a diagram for illustrating an operation plan held in a server in an operation system according to the embodiment of the present disclosure.

FIG. 3 is a diagram for illustrating an exemplary configuration of the propulsion system of vehicle 1 and an exemplary operation plan held in server 500. Referring to FIG. 3 together with FIGS. 1 and 2, vehicle 1 includes a motor generator (MG) 20, an ECU 21, a power control unit (PCU) 22, a braking apparatus 30, a brake sensor 30a, a human detecting sensor 40, a battery 160, a navigation system (which is also referred to as "NAVI" below) 170, a reader 180, and a drive wheel W. MG 20, ECU 21, and PCU 22 are included in propulsion system 123C. Braking apparatus 30 and brake sensor 30a are included in brake system 121 (FIG. 1).

Battery 160 supplies electric power to propulsion system 123C. A known vehicle power storage device (for example, a liquid secondary battery, an all-solid-state secondary battery, or a battery assembly) can be adopted as battery 160. Examples of the vehicle secondary battery include a lithium ion battery and a nickel metal hydride battery. Battery 160 may be configured to be capable of contact charging (plug-in charging).

Battery 160 is provided with a battery management system (BMS) 160a. BMS 160a includes various sensors that detect states (for example, a voltage, a current, and a temperature) of battery 160 and outputs a result of detection to integrated control manager 115. Controller 150 can obtain the states (for example, the temperature, the current, the voltage, and an SOC) of battery 160 based on an output signal (BMS signal) from BMS 160a. The state of charge (SOC) represents an amount of remaining stored power, and expresses, for example, a ratio of a current amount of stored power to an amount of stored power in a fully charged state, as 0 to 100%.

Propulsion system 123C generates driving force for travel of vehicle 1 with electric power stored in battery 160. MG 20 is, for example, a three-phase alternating-current (AC) motor generator. PCU 22 includes, for example, an inverter, a converter, and a relay (which is referred to as a "system main relay (SMR)" below. PCU 22 is controlled by ECU 21. The SMR is configured to switch between connection and disconnection of an electric path from battery 160 to MG 20. The SMR is closed (connected) when vehicle 1 travels.

MG 20 is driven by PCU 22 to rotate drive wheel W of vehicle 1. In addition, MG 20 carries out regeneration and supplies generated electric power to battery 160. PCU 22 drives MG 20 with electric power supplied from battery 160. Vehicle 1 may include any number of motors (MGs 20) for travel, and may include a single motor, two motors, or three or more motors. The motor for travel may be an in-wheel motor. Though FIG. 3 schematically shows only a single drive wheel W, vehicle 1 may include any number of drive wheels W and may be adapted to any type of drive. The type of drive of vehicle 1 may be any of front-wheel drive, rear-wheel drive, and four-wheel drive.

Each wheel (including drive wheel W) included in vehicle 1 is provided with braking apparatus 30 and brake sensor 30a that detects braking force applied to the wheel by braking apparatus 30. Brake sensor 30a may be a hydraulic sensor that detects a hydraulic pressure applied to a brake pad (or a wheel cylinder). Braking forces (for example, hydraulic pressures corresponding to braking forces) for respective wheels detected by four brake sensors 30a are outputted to integrated control manager 115.

Human detecting sensor 40 is configured to detect whether or not there is a person (for example, a passenger) in vehicle 1. More specifically, human detecting sensor 40 obtains information for recognition of an in-vehicle environment of vehicle 1 and outputs the obtained information to integrated control manager 115. Human detecting sensor 40 includes, for example, at least one of a camera aimed at the inside of the vehicle and an infrared sensor. Human detecting sensor 40 may further include at least one of a seating sensor and a seat belt sensor. Controller 150 can determine whether or not there is a person in vehicle 1 based on an output from human detecting sensor 40.

NAVI 170 includes a touch panel display, a positioning sensor, and a storage (none of which is shown). Map information is stored in the storage. NAVI 170 is configured to show in real time, a position of vehicle 1 on the map. NAVI 170 is configured to search for a path for finding an optimal route (for example, a shortest route) from the current position to a destination of vehicle 1 by referring to the map information. NAVI 170 may sequentially update the map information by OTA.

Reader 180 is configured to read prescribed identification information from an image. More specifically, reader 180 picks up an image, extracts a prescribed code from the image, and performs decoding processing. The code extracted from the image is converted to prescribed identification information through the decoding processing. Reader 180 then outputs the identification information read from the image to integrated control manager 115. Without being limited to the above, any method of reading by reader 180 is applicable. For example, reader 180 may be a radio frequency identification (RFID) reader. Reader 180 may be provided as being available to a user outside the vehicle.

Vehicle 1 according to this embodiment is an automated-driving vehicle. Vehicle 1 provides a service by automated driving in the absence of a driver. In other words, there is no vehicle manager in vehicle 1. Basically, only a service user gets on vehicle 1, and when all service users get off the vehicle, there will be nobody in vehicle 1.

Server 500 can identify a user who is using vehicle 1 based on information from vehicle 1. Server 500 manages information on each user (user information) registered in storage 503. Identification information (user ID) for identification of the user is provided for each user, and server 500 manages the user information as being distinguished based on the user ID. In this embodiment, each user registered in server 500 carries mobile terminal UT. The user information includes personal information (a name, an address, an age, a history of use of the service, and the like) and an address of mobile terminal UT carried by the user. Server 500 may manage a service use fee for each user.

Application software (which is referred to as a "mobile app" below) for use of a transport service provided by server 500 is installed in mobile terminal UT. Mobile terminal UT sends a request for a task (transport) to server 500, and when it receives a reply indicating approval from server 500 (for example, see S103 in FIGS. 5 and 9 which will be described later), it can show a code issued by server 500. When the user holds mobile terminal UT showing the code over reader 180 of vehicle 1, controller 150 identifies the user based on information from mobile terminal UT and performs processing for performing the requested task (transport) (for example, control for opening and closing of a door of vehicle 1 and travel control in accordance with an operation plan).

The operation system according to this embodiment includes server 500 and a plurality of vehicles 1 configured as shown in FIGS. 1 to 3. The plurality of vehicles 1 are registered in server 500. Each vehicle registered in server 500 may function as a robotaxi vehicle. Server 500 generates an operation plan of each of the plurality of vehicles 1 and has the generated operation plan stored in storage 503. Identification information (vehicle ID) for identification of the vehicle is provided for each vehicle, and server 500 manages information (including the operation plan) on each vehicle as being distinguished based on the vehicle ID. Server 500 instructs each of the plurality of vehicles 1 to operate in accordance with the operation plan stored in storage 503.

The operation plan stored in storage 503 includes a type of a task (for example, transport of a person or transport of a load), task start information, task end information, pre-task movement information, during-task movement information, post-task movement information, a stand-by point, and a stand-by period (stand-by start time and stand-by end time) at the stand-by point. The task start information indicates a task start point and task start time. The task end information indicates a task end point and task end time. The pre-task movement information indicates a path and a travel condition for the vehicle to head for the task start point before start of the task. The during-task movement information indicates a path and a travel condition for movement of the vehicle from the task start point to the task end point while the vehicle performs the task. The post-task movement information indicates a path and a travel condition for movement of the vehicle from the task end point to the stand-by point after the end of the task. The stand-by point is a location where the vehicle stands by after it performs the requested task. An operation plan in which a plurality of tasks are set is stored in storage 503 in such a manner that the type of the task, the pre-task movement information, the task start information, the during-task movement information, the task end information, the post-task movement information, the stand-by point, and the stand-by period are distinguished for each task.

The initial operation plan of the vehicle includes only a non-service section. When a task requested by the user (service user) is allocated to the vehicle, a service section is added to the operation plan of that vehicle (see FIGS. 5 and 9 which will be described later). Though details will be described later, the service section corresponds to a section in the operation plan where the vehicle works for the task (see FIG. 7 which will be described later). The non-service section refers to a section in the operation plan which does not fall under the service section.

Information indicating a current status (for example, a position, a vehicle speed, an amount of remaining energy, and whether or not there is a passenger) of each vehicle registered in server 500 is further stored in storage 503. Server 500 sequentially receives information (for example, a result of detection by each of various vehicle-mounted sensors) indicating the current status of each registered vehicle from the vehicle. Specification information of each vehicle registered in server 500 may further be stored in storage 503. In this embodiment, each vehicle registered in server 500 corresponds to vehicle 1 (see FIGS. 1 to 3) configured as described previously.

Server 500 accepts a task request from a user terminal (for example, mobile terminal UT). FIG. 4 is a diagram showing an exemplary screen (task request screen) for a user to send a request for a task (transport) to server 500. Referring to FIG. 4, a screen Sc1 is shown, for example, on the touch panel display of mobile terminal UT. Screen Sc1 includes a map M10 (map), a display section P101 (for example, an icon) showing the task start point, a display section M1 (for example, a text box) showing time and day of start of the task, a display section P102 (for example, an icon) showing the task end point, a display section M2 (for example, a text box) showing time and day of end of the task, an operation portion M11 (for example, a check box or a radio button) for the user to input the type of the task, and an operation portion M12 (for example, a button) for the user to send the request for the task to server 500.

The user can have desired map M10 shown on mobile terminal UT by performing an operation (for example, scrolling) onto the touch panel. The user can designate any position on map M10 by tapping shown map M10. The user can designate each of the task start point and the task end point by such an operation (tapping) onto the touch panel. Display sections P101 and P102 show on map M10, the task start point and the task end point designated by the user, respectively. The user can input each of the time and day of start of the task and the time and day of end of that task into mobile terminal UT by the operation onto the touch panel (for example, the operation onto a touch keyboard) or an audio input. Display sections M1 and M2 show the time and day of start of the task and the time and day of end of the task inputted by the user, respectively. Operation portion M11 accepts, for example, input of an object to be transported (person/load). When the user operates operation portion M12, the request for the task including contents designated in display sections P101, P102, M1, and M2 and operation portion M11 is sent to server 500 from mobile terminal UT. Specifically, mobile terminal UT transmits to server 500, a first task request signal indicating the user ID, the type of the task (for example, transport of a person or a load) inputted in operation portion M11, the task start information shown in display sections P101 and M1, and the task end information shown in display sections P102 and M2.

Screen Sc1 shown in FIG. 4 can be modified as appropriate. For example, operation portion M11 may further accept an input of an amount of task (the number of persons or an amount of loads). The first task request signal may further indicate the amount of task.

Figure 5:
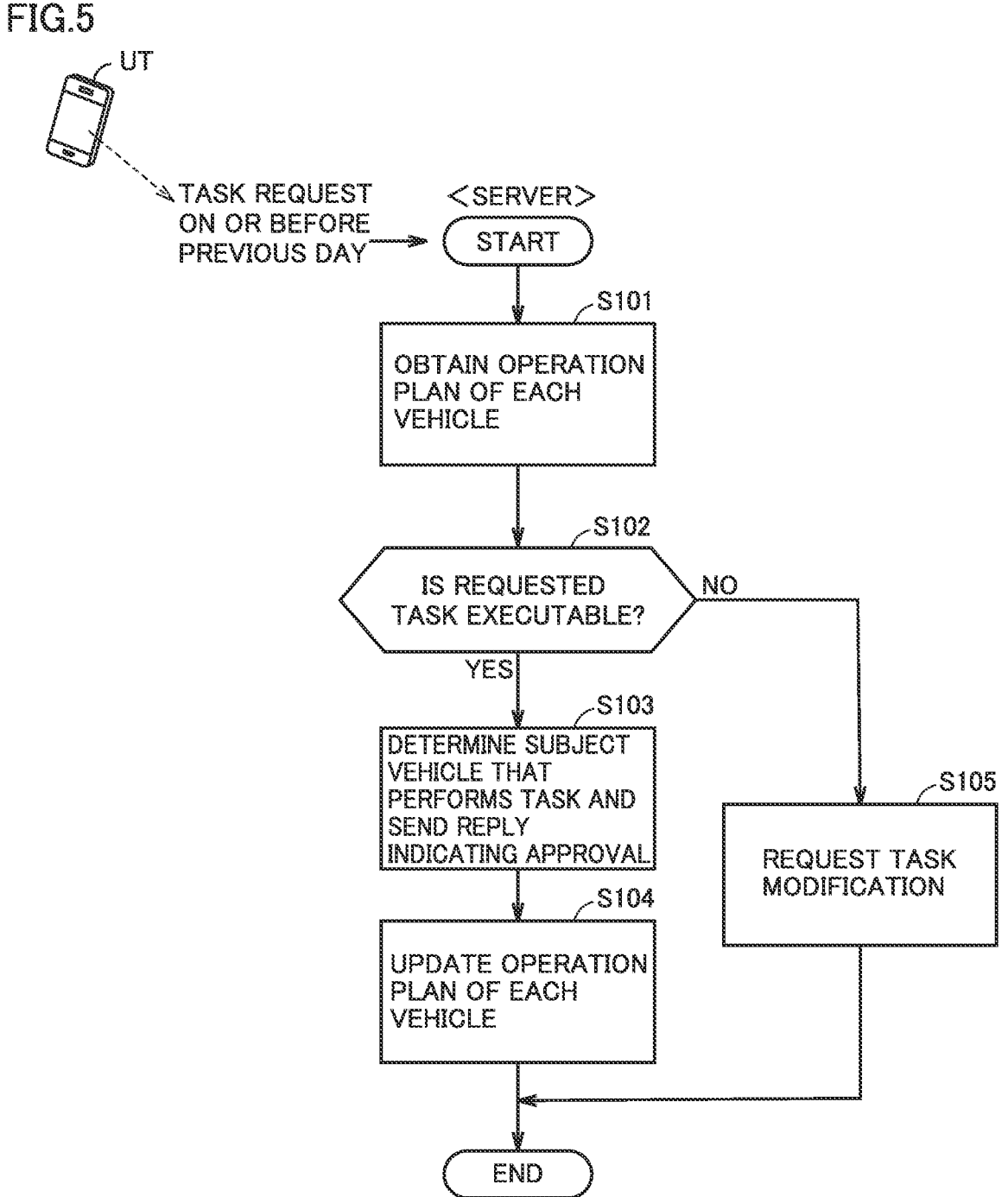
FIG. 5 is a flowchart showing processing involved with task reservation in an operation method according to the embodiment of the present disclosure.

The user can reserve a task in server 500 by sending the request for the task to server 500 with the use of mobile terminal UT on or before a previous day of execution of the operation plan. In the example shown in FIG. 4, the day of start of the task shown in display section M1 corresponds to the day of execution of the operation plan. Server 500 accepts a task request from each of a plurality of registered users. Each user requests the task with the use of mobile terminal UT (see FIG. 4). When server 500 receives the first task request signal described previously from one mobile terminal UT, it performs a series of processing shown in FIG. 5 which will be described below for the user corresponding to that mobile terminal UT. Each time server 500 receives the request for the task from any registered user, it performs the series of processing shown in FIG. 5 for that user. FIG. 5 is a flowchart showing processing involved with task reservation. "S" in the flowchart means a step.

Referring to FIG. 5 together with FIGS. 1 to 3, in S101, server 500 obtains the operation plan of each registered vehicle. Specifically, processor 501 reads the operation plan of each vehicle from storage 503. In following S102, server 500 determines whether or not any vehicle can perform the task requested in the first task request signal based on the operation plan of each vehicle and contents (for example, the task start information and the task end information) of the task indicated in the first task request signal. For example, server 500 checks the operation plan of each registered vehicle, and when there is a vehicle in which the service section for execution of the requested task can be added, the server determines that the requested task is executable, and when there is no vehicle in which the service section for execution of the requested task can be added, the server determines that the requested task is not executable.

When server 500 determines that the requested task is not executable (NO in S102), in S105, server 500 requests mobile terminal UT (the terminal of the user who has requested the task) to modify the task. When processing in S105 is performed, the series of processing shown in FIG. 5 ends. The user who has been requested to modify the task may have mobile terminal UT show, for example, screen Sc1 shown in FIG. 4. The user may change contents of the task by operating mobile terminal UT and may send again the request for the modified task to server 500. Server 500 that has again received the request starts again the series of processing shown in FIG. 5.

When server 500 determines that the requested task is executable (YES in S102), in S103, server 500 determines a vehicle that is to perform the requested task (which is also referred to as a "subject vehicle" below) among the plurality of registered vehicles, and sends back to mobile terminal UT (the terminal of the user who has requested the task), an approval signal indicating that the requested task will be performed.

Server 500 determines as the subject vehicle, the vehicle in which the service section for performing the requested task can be added, based on the operation plan of each registered vehicle. When there are a plurality of such vehicles, server 500 may select a vehicle suited to the requested task, for example, based on at least one of performance of the vehicle, a status of the vehicle (for example, the current status and a status predicted from the operation plan) at the task start time and a position of the vehicle (for example, the current position and a position predicted from the operation plan) at the task start time.

When the processing in S103 is performed, the process proceeds to S104. In S104, server 500 generates the operation plan of the subject vehicle and updates the operation plan of each registered vehicle. Specifically, server 500 adds the service section for performing the task to the operation plan of the subject vehicle to which the task has been allocated, and arranges the operation plan of another vehicle such that the plurality of vehicles do not contend. For example, server 500 may determine a vehicle speed for each road included in a path based on a legal speed for each road included in the path and travel performance (for example, relation between the vehicle speed and a ratio of energy consumption) of vehicle 1. Server 500 may set as the stand-by point, a parking space (for example, a charging station or a fueling station) where replenishment with energy can be made. Vehicle 1 that stands by at the parking space where replenishment with energy can be made may be replenished with energy as necessary. In S104, server 500 may set the operation plan (including the vehicle speed for each road) to observe the laws, avoid contention, and enhance energy efficiency. The operation plan set here may be modified before an operation instruction is given (see S14 in FIG. 6 which will be described later).

In processing in S104, the task is reserved in server 500. When the processing in S104 is performed, the series of processing shown in FIG. 5 ends. Server 500 in which the task has been reserved performs a series of processing shown in FIG. 6 which will be described below when prescribed time on the day (the day when the operation plan is to be executed) comes. The prescribed time may be predetermined service start time (for example, five in the morning). Alternatively, server 500 may determine the prescribed time based on the operation plan of each vehicle so as to be able to perform the earliest reserved task.

Figure 6:
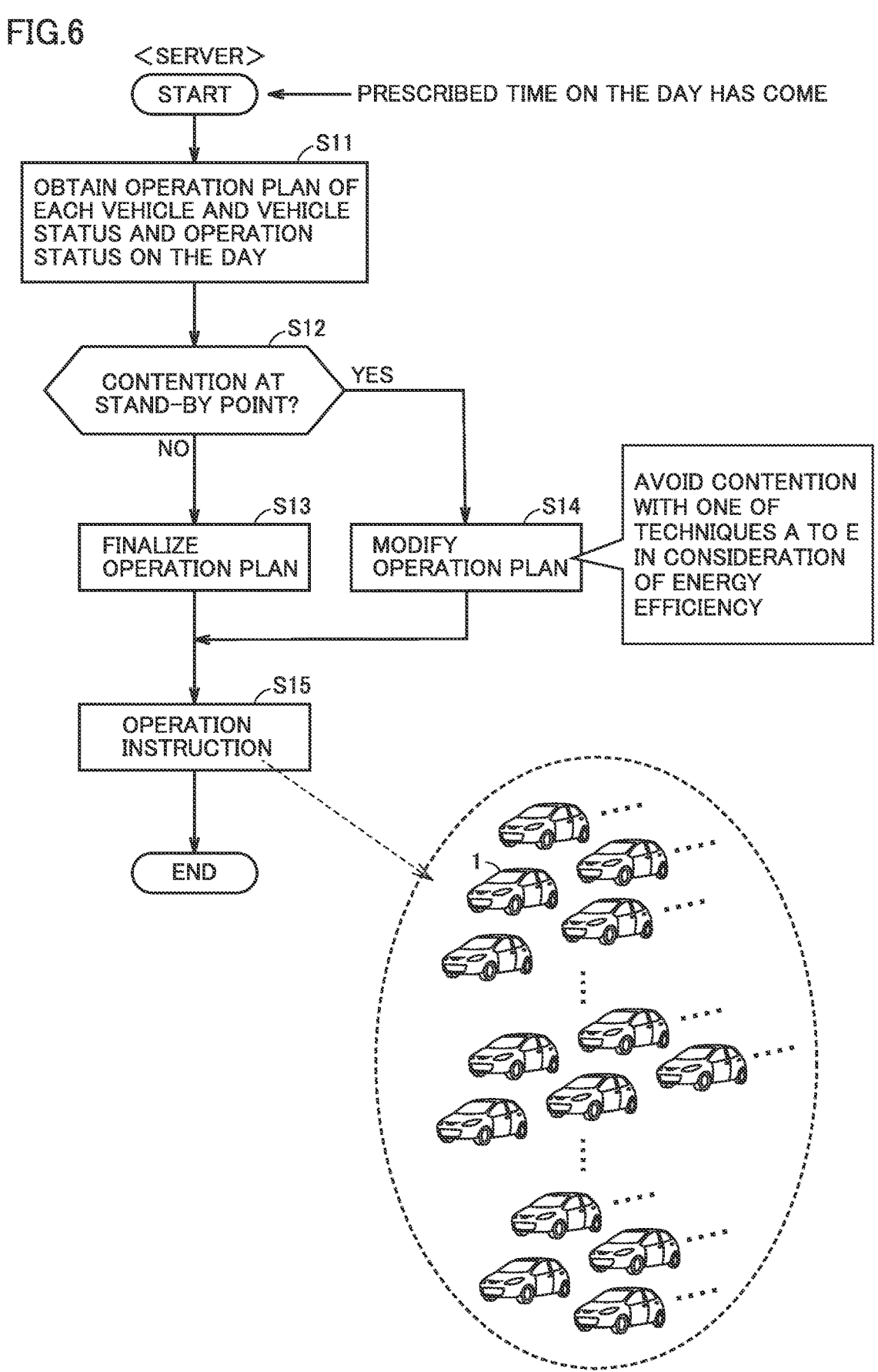
FIG. 6 is a flowchart showing processing for performing a task in accordance with the reserved operation plan in the operation method according to the embodiment of the present disclosure.

FIG. 6 is a flowchart showing processing for performing the task in accordance with the reserved operation plan. Referring to FIG. 6 together with FIGS. 1 to 3, in S11, server 500 obtains the operation plan (see FIG. 3) of each registered vehicle, vehicle information indicating the current status of each registered vehicle, and operation information (latest predicted information at the current time point) indicating a predicted today's operation status. The vehicle information may indicate the current position and the amount of remaining energy of the vehicle. The operation information may indicate a traffic congestion status for each road and a weather condition (for example, weather such as fine/cloudy/rainy/snowy and an air temperature).

In S12, server 500 determines based on the operation plan, the vehicle information, and the operation information obtained in S11, whether or not contention will occur if it instructs each vehicle registered in server 500 to operate in accordance with the operation plan. Contention refers to an event in which a plurality of vehicles stand by at the same stand-by point at the same timing.

When server 500 determines that the contention will not occur in the operation plan (that is, the operation plan of each vehicle stored in storage 503 at the time of start of the series of processing shown in FIG. 6) obtained in S11 (NO in S12), in S13, it determines not to modify the operation plan (finalize the operation plan). In succession, in S15, server 500 instructs each registered vehicle to operate in accordance with the operation plan. When each vehicle registered in server 500 receives the instruction from server 500, it performs operation in accordance with the operation plan by automated driving. The requested task is thus performed. Server 500 is thus configured to generate the operation plan of each of the plurality of vehicles 1 and to instruct each of the plurality of vehicles 1 to operate in accordance with the generated operation plan. The operation plan is generated for each subject vehicle to which the task is allocated (see FIG. 5).

When server 500 determines that the contention will occur in the operation plan obtained in S11 (YES in S12), in S14, it modifies the operation plan of at least one of a plurality of contending vehicles 1 to avoid contention. In this embodiment, server 500 modifies the operation plan with one of techniques A to E shown below. Techniques A to E may be implemented in server 500 as arbitration protocols.

Technique A: to change the stand-by point in the operation plan

Figure 7:
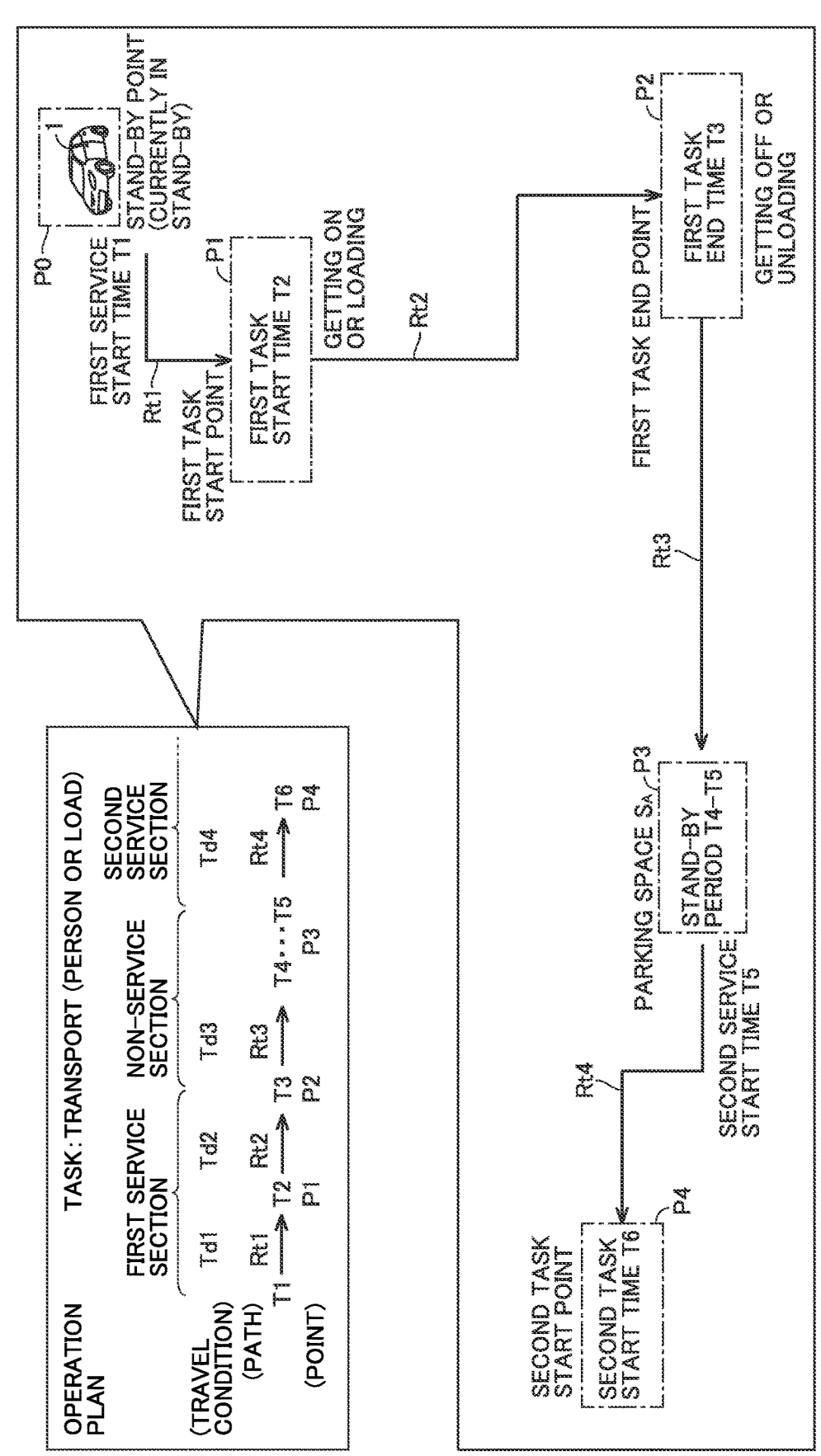
FIG. 7 is a diagram for illustrating the operation plan of the vehicle adopted in the operation system according to the embodiment of the present disclosure.
Figure 8:
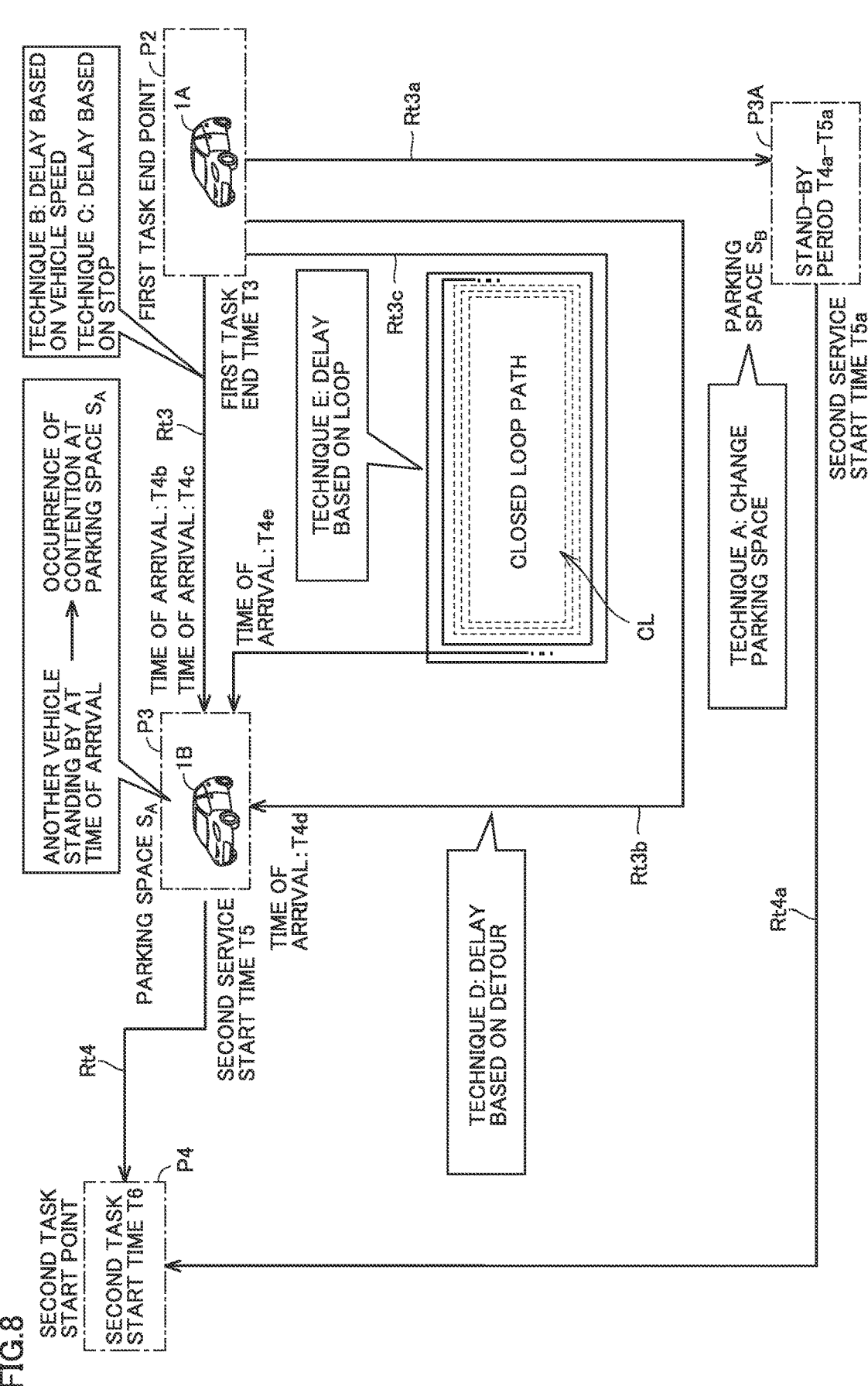
FIG. 8 is a diagram for illustrating a contention avoidance technique that can be adopted when it is determined that contention will occur in the operation plan shown in FIG. 7, in the operation method according to the embodiment of the present disclosure.

Technique B: to change the travel condition in the operation plan so as to lower the vehicle speed in travel to the stand-by point (a location where contention is predicted to occur) in accordance with the path in the operation plan, without change of the path Technique C: to change the travel condition in the operation plan such that the vehicle stops a prescribed number of times on the path in the operation plan, without change of the path Technique D: to change the path in the operation plan to a detour path Technique E: to change the path in the operation plan so as to include a loop path including a prescribed number of laps Processing in S14 will be described below with reference to FIGS. 7 and 8. FIG. 7 is a diagram for illustrating an exemplary operation plan of vehicle 1. The operation plan shown in FIG. 7 includes a current position P0 of vehicle 1, service start time T1 for the first task, a first task start point P1, first task start time T2, a first task end point P2, first task end time T3, a stand-by point P3 after the first task, the stand-by period at stand-by point P3, service start time T5 for a second task, a second task start point P4, and second task start time T6.

In the example shown in FIG. 7, the parking space where vehicle 1 currently stands by (is being parked) corresponds to current position P0. Service start time T1 corresponds to time of departure of vehicle 1 from the current position for the first task. When the type of the requested first task falls under transport of a person, a location where the person gets on vehicle 1 and time thereof correspond to start point P1 and start time T2, respectively, and a location where the person on board vehicle 1 gets off vehicle 1 and time thereof correspond to end point P2 and end time T3, respectively. When the type of the requested first task falls under transport of the load, a location where the load is loaded on vehicle 1 and time thereof correspond to start point P1 and start time T2, respectively, and a location where the load loaded on vehicle 1 is unloaded from vehicle 1 and time thereof correspond to end point P2 and end time T3, respectively. The type of the first task, start point P1, end point P2, start time T2, and end time T3 are designated by the first task request signal (see FIG. 4). In consideration of a time period (required time period) required for getting on/loading and getting off/unloading, server 500 may set start time T2 and end time T3 a prescribed time period (a predicted required time period) before scheduled departure time of the vehicle at start point P1 and end point P2.

Stand-by point P3 corresponds to a parking space (which is also referred to as a "parking space $S_A$" below) where vehicle 1 stands by after it performs the first task. The stand-by period at stand-by point P3 corresponds to a period from time T4 (stand-by start time) of arrival of vehicle 1 that has performed the first task at stand-by point P3 until service start time T5 (stand-by end time). Service start time T5 corresponds to time of departure (scheduled departure time) of vehicle 1 from stand-by point P3.

The operation plan shown in FIG. 7 further includes a path Rt1 (first path) and a travel condition Td1 thereof (first travel condition), a path Rt2 (second path) and a travel condition Td2 thereof (second travel condition), a path Rt3 (third path) and a travel condition Td3 thereof (third travel condition), and a path Rt4 (fourth path) and a travel condition Td4 thereof (fourth travel condition). Paths Rt1 to Rt4 correspond to paths from current position P0 to start point P4. Path Rt1 is a path from current position P0 to start point P1. Path Rt2 is a path from start point P1 to end point P2. Path Rt3 is a path from end point P2 to stand-by point P3. Path Rt4 is a path from stand-by point P3 to start point P4. Each travel condition includes, for example, a vehicle speed. Each travel condition may further include the number of times of stop on that path (for example, see technique C). The travel condition of the path including the loop path may further include the number of laps of the loop path (for example, see technique E). Without being limited as such, each travel condition may indicate a more detailed condition relating to travel.

The operation plan includes a first service section, the non-service section, and a second service section. The first service section includes a section where vehicle 1 heads for the first task start point for performing the first task (current position P0 and service start time T1 to start point P1 and start time T2) and a section from the first task start point to the first task end point (start point P1 and start time T2 to end point P2 and end time T3). The non-service section includes a section from the first task end point to the stand-by point (end point P2 and end time T3 to stand-by point P3 and time T4) and the stand-by period (stand-by point P3 and time T4 to stand-by point P3 and service start time T5). The second service section includes a section where vehicle 1 heads for the second task start point for performing the second task (stand-by point P3 and service start time T5 to start point P4 and start time T6) and a section from the second task start point to the second task end point (not shown). Though FIG. 7 does not show the operation plan for performing the second task, the operation plan also for the second task following the first task is set in a manner in conformity with the first task described above.

FIG. 8 is a diagram for illustrating techniques A to E that can be adopted when it is determined that contention will occur in the operation plan shown in FIG. 7. Each of vehicles 1A and 1B in FIG. 8 corresponds to the vehicle (vehicle 1) registered in server 500. In the example shown in FIG. 8, in S11 in FIG. 6, server 500 obtains the operation plan shown in FIG. 7 as the operation plan of vehicle 1A. When vehicle 1A operates in accordance with the operation plan shown in FIG. 7, vehicle 1A performs the first task by moving from start point P1 to end point P2. When vehicle 1A that has finished the first task moves from end point P2 to start point P4 in accordance with the operation plan shown in FIG. 7, vehicles 1A and 1B contend at stand-by point P3 (parking space $S_A$). Therefore, server 500 determines, at timing (S12 in FIG. 6) before it instructs vehicle 1A to operate in accordance with the operation plan shown in in FIG. 7, that the contention between vehicles 1A and 1B will occur (YES in S12) if it instructs each vehicle to operate in accordance with the operation plan obtained in S11.

Of two vehicles 1A and 1B that will contend at stand-by point P3, vehicle 1B early in stand-by start time at stand-by point P3 shown in the operation plan falls under a preceding vehicle (the vehicle that stands by at stand-by point P3 earlier than vehicle 1A), and vehicle 1A later in stand-by start time at stand-by point P3 shown in the operation plan falls under a subsequent vehicle (the vehicle that stands by at stand-by point P3 subsequently to vehicle 1B). The stand-by start time at stand-by point P3 shown in the operation plan (FIG. 7) of vehicle 1A is time T4.

When determination as YES is made in S12 in FIG. 6 as described above, processing in S14 is performed. In S14, server 500 avoids contention at stand-by point P3 with one of techniques A to E described previously.

Referring to FIG. 8, with technique A, for example, server 500 changes the stand-by point in the operation plan of vehicle 1A from stand-by point P3 (parking space $S_A$) to a stand-by point P3A (a parking space $S_B$). Server 500 may set as stand-by point P3A, parking space $S_B$ where vehicle 1A does not contend with another vehicle. With such change in stand-by point, server 500 newly sets a path Rt3a from end point P2 to stand-by point P3A, the stand-by period at stand-by point P3A, and a path Rt4a from stand-by point P3A to start point P4. Server 500 may change the service start time for the second task from service start time T5 to service start time T5a. In such a form, a period from time T4a of arrival of vehicle 1 at stand-by point P3A until service start time T5a corresponds to the stand-by period at stand-by point P3A. Server 500 may set the stand-by period of vehicle 1A at stand-by point P3A such that vehicle 1A does not contend with another vehicle at stand-by point P3A.

Server 500 may set service start time T5a such that vehicle 1A can arrive at start point P4 before start time T6.

With technique B, server 500 changes the travel condition in the operation plan of vehicle 1A, for example, to lower the vehicle speed (for example, an average vehicle speed) while vehicle 1A travels over path Rt3, without changing path Rt3 in the operation plan of vehicle 1A. Travel over path Rt3 by vehicle 1A corresponds to travel by vehicle 1A to stand-by point P3 by following the path in the operation plan shown in FIG. 7. According to technique B, the vehicle speed while vehicle 1A travels over path Rt3 is lowered, so that stand-by start time of vehicle 1A at stand-by point P3 is delayed to avoid contention between vehicles 1A and 1B at stand-by point P3. With technique B, the stand-by start time (scheduled time of arrival of vehicle 1A at stand-by point P3) of vehicle 1A at stand-by point P3 is changed, for example, to time T4b later than time T4 shown in FIG. 7. Server 500 sets as time T4b, time later than the scheduled departure time (scheduled time of departure of vehicle 1B from stand-by point P3) of vehicle 1B at stand-by point P3. Server 500 may set time T4b in conformity with the scheduled departure time of vehicle 1B such that vehicles 1A and 1B are replaced with each other at stand-by point P3. Alternatively, server 500 may change the scheduled departure time of vehicle 1B in conformity with time T4b such that vehicles 1A and 1B are replaced with each other at stand-by point P3. As vehicles 1A and 1B are replaced with each other at stand-by point P3, occupation of stand-by point P3 by another vehicle (for example, a vehicle not registered in server 500) after vehicle 1B leaves stand-by point P3 can be suppressed.

With technique C, server 500 changes the travel condition in the operation plan of vehicle 1A, for example, such that vehicle 1A travels to stand-by point P3 while it makes a prescribed number of times of stop (for example, stop for a short period of time) on path Rt3, without changing path Rt3 in the operation plan of vehicle 1A. Server 500 determines the prescribed number of times (the number of times of stop) to avoid contention, for example, based on the operation plan of vehicle 1B (in particular, time of departure of vehicle 1B from stand-by point P3). A duration of stop may be fixed (for example, at an upper limit value of a statutory allowable duration of stop) or variable depending on a status (for example, a degree of congestion). According to technique C, vehicle 1A travels while making stops when it heads for stand-by point P3 following path Rt3, so that stand-by start time of vehicle 1A at stand-by point P3 is delayed to avoid contention between vehicles 1A and 1B at stand-by point P3. As the number of times of stop is larger, stand-by start time is later. With technique C, stand-by start time of vehicle 1A at stand-by point P3 is changed, for example, to time T4c later than time T4 shown in FIG. 7. Server 500 sets as time T4c, time later than the scheduled departure time of vehicle 1B at stand-by point P3. Server 500 may set time T4c in conformity with the scheduled departure time of vehicle 1B such that vehicles 1A and 1B are replaced with each other at stand-by point P3. Alternatively, server 500 may change the scheduled departure time of vehicle 1B in conformity with time T4c such that vehicles 1A and 1B are replaced with each other at stand-by point P3. As vehicles 1A and 1B are replaced with each other at stand-by point P3, occupation of stand-by point P3 by another vehicle after vehicle 1B leaves stand-by point P3 can be suppressed.

With technique D, server 500 modifies the operation plan of vehicle 1A to avoid contention at stand-by point P3, for example, by changing the path in the operation plan of vehicle 1A to a detour path Rt3b. Specifically, server 500 delays the stand-by start time of vehicle 1A at stand-by point P3 by such change in path. Detour path Rt3*b* is longer in distance than path Rt3. Therefore, as vehicle 1A heads for stand-by point P3 by taking detour path Rt3*b*, time of arrival of vehicle 1A at stand-by point P3 is later. With technique D, the stand-by start time of vehicle 1A at stand-by point P3 is changed, for example, to time T4*d* later than time T4 shown in FIG. 7. Server 500 may search for a detour path from end point P2 to stand-by point P3 with the use of the map information on NAVI 170. Server 500 sets as time T4*d*, time later than the scheduled departure time of vehicle 1B at stand-by point P3. Server 500 determines detour path Rt3*b* such that contention can be avoided at time T4*d*. When a plurality of detour paths that allow avoidance of contention are found as a result of search, server 500 may determine the detour path smallest in amount of energy required for arrival at stand-by point P3, as detour path Rt3*b*. Server 500 may set time T4*d* in conformity with the scheduled departure time of vehicle 1B such that vehicles 1A and 1B are replaced with each other at stand-by point P3. Server 500 may adjust time T4*d* by changing the travel condition (for example, the vehicle speed or the number of times of stop) for detour path Rt3*b*. Alternatively, server 500 may change the scheduled departure time of vehicle 1B in conformity with time T4*d* such that vehicles 1A and 1B are replaced with each other at stand-by point P3. As vehicles 1A and 1B are replaced with each other at stand-by point P3, occupation of stand-by point P3 by another vehicle after vehicle 1B leaves stand-by point P3 can be suppressed. When a detour path that allows avoidance of contention is not found in the search, server 500 does not adopt technique D.

With technique E, server 500 modifies the operation plan of vehicle 1A, for example, such that the path in the operation plan of vehicle 1A includes a loop path CL including a prescribed number of laps. The path in the operation plan of vehicle 1A is thus changed to a path Rt3*c* including loop path CL. Loop path CL is a closed loop path which vehicle 1A can go around. Server 500 determines the prescribed number of laps to avoid contention, for example, based on the operation plan (in particular, the time of departure of vehicle 1B from stand-by point P3) of vehicle 1B. The stand-by start time of vehicle 1A at stand-by point P3 is thus delayed to avoid contention between vehicles 1A and 1B at stand-by point P3. As the number of laps of loop path CL is larger, time of arrival of vehicle 1A at stand-by point P3 is later. Server 500 may determine the smallest number of laps that allows avoidance of contention as the prescribed number of laps. With technique E, the stand-by start time of vehicle 1A at stand-by point P3 is changed, for example, to time T4*e* later than time T4 shown in FIG. 7. Server 500 may search for a path to reach stand-by point P3 from end point P2 via the closed loop path, with the use of the map information on NAVI 170. Server 500 sets as time T4*e*, time later than the scheduled departure time of vehicle 1B at stand-by point P3. Server 500 determines loop path CL and the number of laps thereof such that contention can be avoided at time T4*e*. Server 500 may set time T4*e* in conformity with the scheduled departure time of vehicle 1B such that vehicles 1A and 1B are replaced with each other at stand-by point P3. Server 500 may adjust time T4*e* by changing the travel condition (for example, the vehicle speed or the number of times of stop) for path Rt3*c*. Alternatively, server 500 may change the scheduled departure time of vehicle 1B in conformity with time T4*e* such that vehicles 1A and 1B are replaced with each other at stand-by point P3. As vehicles 1A and 1B are replaced with each other at stand-by point P3, occupation of stand-by point P3 by another vehicle after vehicle 1B leaves stand-by point P3 can be suppressed. When a loop path that allows avoidance of contention is not found in the search, server 500 does not adopt technique E.

As set forth above, according to each of techniques A to E, the operation plan can be modified to avoid contention. When there are a plurality of operation plans that allow avoidance of contention, in S14 in FIG. 6, server 500 may select the operation plan highest in energy efficiency from among the plurality of operation plans. Server 500 may select one of techniques A to E from a point of view of energy efficiency.

For example, in techniques B to E, energy may uselessly be consumed for wait for freeing of a space where the preceding vehicle is parked (that is, for spending time while not using the parking space). Server 500 may select technique A when energy consumption for spending time at a place other than the parking space exceeds a prescribed reference value in each of techniques B to E. The automated-driving vehicle that is traveling consumes much energy by sensing for travel (working of the autonomous driving system).

When the vehicle is traveling by automated driving, much energy is consumed whether the vehicle speed is high or low. Therefore, technique C in which time is spent by stopping tends to be high in energy efficiency than other techniques. Technique C, however, cannot necessarily be adopted on all roads. It is difficult to adopt technique C in such a traffic condition that stop may cause congestion.

An amount of energy consumption (electric power consumption) by traveling varies depending on the vehicle speed. Energy consumption by friction and resistance during traveling tends to be higher when the vehicle speed is high than when the vehicle speed is low. Energy consumption by sensing (working of the autonomous driving system) per unit time also tends to be high when the vehicle speed is high than when the vehicle speed is low. This is because sensing over a longer distance is necessary as the vehicle speed is higher. A time period for travel (a time period until arrival at the destination), however, is longer when the vehicle speed is low than when the vehicle speed is high. As the time period for travel is longer, energy consumption by sensing is greater. When techniques B, D, and E are compared with one another, techniques D and E are longer in travel distance than technique B. Electric power consumption, however, varies depending on the vehicle speed as described above. Therefore, adjustment of time based on the travel distance as in techniques D and E may be higher in energy efficiency than adjustment of time based on change in vehicle speed as in technique B. Server 500 may set an optimal vehicle speed from a point of view of energy efficiency in each of techniques A and C to E.

Server 500 may compare techniques A to E with one another, for example, from the point of view above, to determine as the operation plan of the subsequent vehicle, the operation plan that allows avoidance of contention, the operation plan being obtained by the technique highest in energy efficiency. Server 500 may modify the operation plan of the preceding vehicle as necessary. In S14 in FIG. 6, server 500 modifies the operation plan of at least one of contending preceding vehicle and subsequent vehicle to avoid contention. When the operation plan is modified in the processing in S14, the process proceeds to S15. In S15, server 500 instructs each registered vehicle to operate in accordance with the modified operation plan. Contention during operation is thus suppressed.

Figure 9:
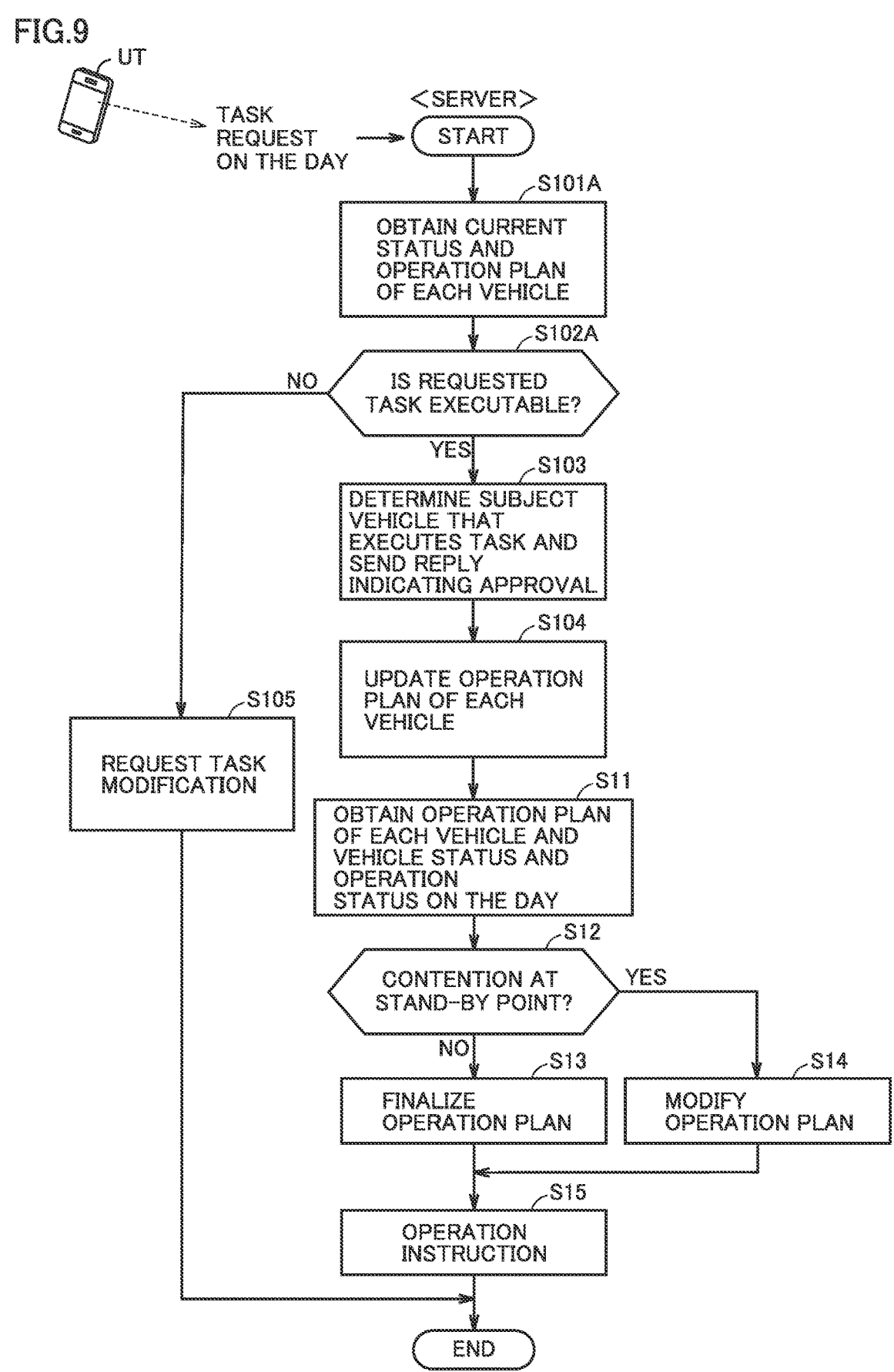
FIG. 9 is a flowchart showing processing for performing a task in accordance with an operation plan requested on the day, in the operation method according to the embodiment of the present disclosure.

The user can also send the request for the task to server 500 on the day of execution of the task (the day) with the use of mobile terminal UT (see FIG. 4). The user can set a day of start of the task (display section M1) to today in screen Sc1 shown in FIG. 4 and operate operation portion M12, so as to send to server 500, the request for the task the day of start of which is today. Mobile terminal UT that has received such an operation transmits a second task request signal to server 500. The second task request signal basically indicates information in accordance with the first task request signal, whereas the day of start of the task indicated by the second task request signal is today (task request day). When server 500 receives the second task request signal from one mobile terminal UT, it performs a series of processing shown in FIG. 9 which will be described below for the user corresponding to that mobile terminal UT. Each time server 500 receives the request for the task from any registered user, it performs the series of processing shown in FIG. 9 for that user. FIG. 9 is a flowchart showing processing for performing the task in accordance with the operation plan requested on the day.

Referring to FIG. 9 together with FIGS. 1 to 3, in S101A, server 500 obtains the operation plan and the current status (for example, the position and an amount of remaining energy) of each registered vehicle. In S102A, server 500 determines whether or not any vehicle can perform the task requested in the second task request signal based on the operation plan and the current status of each vehicle and contents (for example, the task start information and the task end information) of the task indicated in the second task request signal. For example, server 500 cheeks the operation plan and the current status of each registered vehicle, and when there is a vehicle in which the service section for performing the requested task can be added, server 500 determines that the requested task is executable, and where there is no vehicle in which the service section for performing the requested task can be added, server 500 determines that the requested task is not executable.

When server 500 determines that the requested task is not executable (NO in S102A), it performs processing in S105. S105 in FIG. 9 is processing in conformity with S105 in FIG. 5. When server 500 determines that the requested task is executable (YES in S102A), it performs processing in S103 and later (S103, S104, and S11 to S15). S103, S104, and S11 to S15 in FIG. 9 are processing in conformity with S103 in S104 in FIGS. 5 and S11 to S15 in FIG. 6. Thus, on the day when server 500 receives the request for the task, operation in accordance with the operation plan (the operation plan finalized in S13 or S14) is performed and the requested task is performed.

As described above, server 500 according to this embodiment is configured to perform determining, before it instructs each of a plurality of vehicles 1 to operate, whether or not contention will occur, the contention referring to the plurality of vehicles 1 standing by at the same stand-by point at the same timing (S12 in FIGS. 6 and 9) if it instructs each of the plurality of vehicles 1 to operate in accordance with the operation plan, and modifying the operation plan of at least one of a plurality of contending vehicles 1 to avoid contention (S14 in FIGS. 6 and 9) when it determines that contention will occur. According to such a configuration, even when variance (difference between the operation plan and an actual operation) is caused due to influence by a real-time vehicle dispatch request or traffic congestion on the day, server 500 can dynamically avoid contention in accordance with a situation. The plurality of vehicles 1 can thus efficiently share limited parking spaces. Since operation management with less operation resources (parking spaces) can be achieved, operation efficiency is improved. Server 500 configured as above can achieve enhanced operation efficiency while it achieves suppression of increase in amount of operation resources. As server 500 allows operations of the plurality of vehicles 1 in coordination in the non-service section, operation efficiency is more readily enhanced.

Figure 10:
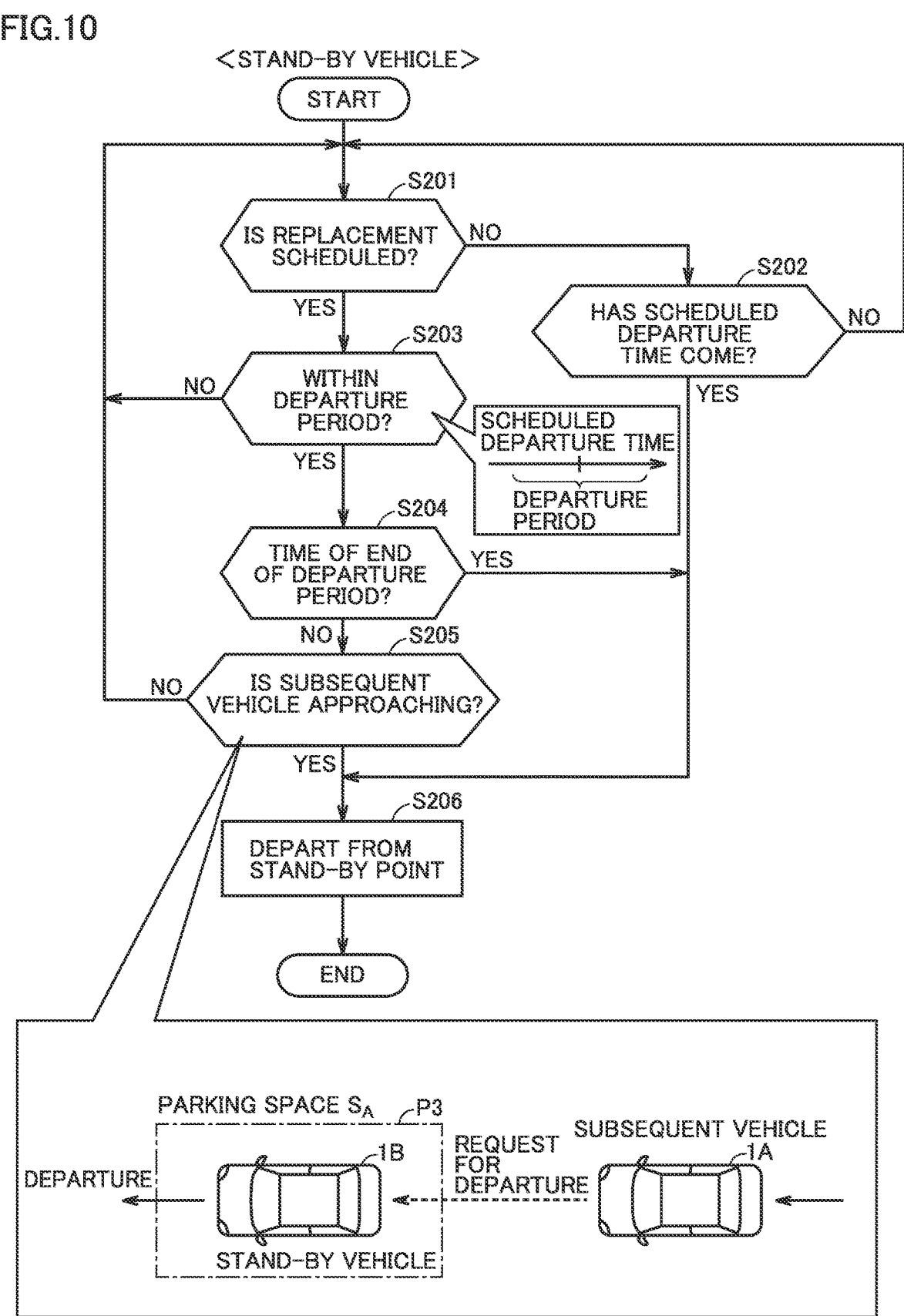
FIG. 10 is a flowchart showing exemplary automated driving control carried out by a stand-by vehicle in the operation method according to the embodiment of the present disclosure.

Vehicle 1 during automated driving in accordance with the operation plan based on an operation instruction (S15 in FIGS. 6 and 9) from server 500 may perform a series of processing shown in FIG. 10 which will be described below while it stands by at the stand-by point. FIG. 10 is a flowchart showing exemplary automated driving control carried out by a stand-by vehicle (vehicle 1 during stand-by at the stand-by point). In this example, a schedule of replacement (scheduled replacement) between the preceding vehicle and the subsequent vehicle may be set at each stand-by point included in the operation plan. The operation plan including the stand-by point where scheduled replacement is set indicates time of replacement (replacement time) between two vehicles and identification information (vehicle ID) of each replaced vehicle for that stand-by point. Matching between time of arrival (scheduled arrival time) of the subsequent vehicle at a certain stand-by point and time of departure (scheduled departure time) of the preceding vehicle from the stand-by point in the operation plan means setting of the scheduled replacement at the stand-by point. Control carried out while vehicle 1B shown in FIG. 8 stands by at stand-by point P3 will be described below by way of example. Vehicle 1B is the preceding vehicle. Vehicle 1A is the subsequent vehicle. The series of processing shown in FIG. 10 is performed, for example, by controller 150 (FIG. 3) of vehicle 1B.

Referring to FIG. 10 together with FIGS. 1 to 3, in S201, vehicle 1B determines whether or not the scheduled replacement has been set at stand-by point P3 (parking space $S_A$ where the vehicle currently stands by) in the operation plan of vehicle 1B. When the scheduled replacement is not set at stand-by point P3 (NO in S201), in S202, vehicle 1B determines whether or not the scheduled time of departure from stand-by point P3 shown in the operation plan of vehicle 1B has come. Before the scheduled time of departure from stand-by point P3 comes (NO in S202), vehicle 1B repeats processing in S201 and S202 while it stands by at stand-by point P3. When the scheduled time of departure from stand-by point P3 comes (YES in S202), in S206, vehicle 1B departs from stand-by point P3 by automated driving.

When the scheduled replacement has been set at stand-by point P3 (YES in S201), in S203, vehicle 1B determines whether or not the current time is within a prescribed departure period. The departure period is set with the scheduled time of departure from stand-by point P3 shown in the operation plan of vehicle 1B being defined as the reference. The departure period may include a first departure period and a second departure period provided, for example, before and after the scheduled departure time. The first departure period is a period from departure period start time until the scheduled departure time. The second departure period is a period from the scheduled departure time until departure period end time.

When the current time is not within the departure period (NO in S203), the process returns to S201. Therefore, before the departure period start time comes, vehicle 1B does not depart from stand-by point P3.

When the current time is within the departure period (YES in S203), in S204, vehicle 1B determines whether or not the departure period end time has come. When the departure period end time has not come (NO in S204), in S205, vehicle 1B determines whether or not the subsequent vehicle (vehicle 1A) is approaching stand-by point P3. When vehicle 1A is approaching stand-by point P3 (for example, it is approaching a position within a prescribed distance from stand-by point P3), it may transmit a departure request signal including the vehicle ID of vehicle 1A to vehicle 1B by wireless communication. Vehicle 1B may determine whether or not vehicle 1A is approaching stand-by point P3 based on the signal from vehicle 1A. For example, while vehicle 1B does not receive the departure request signal, it determines that vehicle 1A is not approaching stand-by point P3. When the vehicle ID indicated in the received departure request signal matches with the vehicle ID of the subsequent vehicle shown in the operation plan, vehicle 1B determines that vehicle 1A (the subsequent vehicle that will be replaced with vehicle 1B at stand-by point P3) is approaching stand-by point P3.

When vehicle 1A is not approaching stand-by point P3 (NO in S205), the process returns to S201. Vehicle 1B waits for arrival of vehicle 1A during the departure period. When vehicle 1A is approaching stand-by point P3 (YES in S205), in S206, vehicle 1B departs from stand-by point P3 by automated driving. Vehicle 1A then enters stand-by point P3. Vehicle 1A and vehicle 1B are thus replaced with each other at stand-by point P3. When vehicle 1A is delayed as compared with the operation plan, vehicle 1A may not arrive at stand-by point P3 within the departure period. In such a case, the departure period end time comes before vehicle 1A arrives at stand-by point P3 (YES in S204), and in S206, vehicle 1B departs from stand-by point P3 by automated driving. In this case, scheduled replacement between vehicles 1A and 1B is not carried out.

As described above, the example shown in FIG. 10 is configured such that, when vehicle 1A approaches while vehicle 1B instructed to operate in accordance with the operation plan including scheduled replacement between vehicle 1B (first movable body) and vehicle 1A (second movable body) at stand-by point P3 stands by at stand-by point P3, vehicle 1B departs from stand-by point P3. According to such a configuration, vehicle 1A more readily enters stand-by point P3 at the timing of departure of vehicle 1B from stand-by point P3.

In the embodiment, server 500 selects a method of avoiding contention from among techniques A to E. In some embodiments, however, that there are five options for the method of avoiding contention. For example, another technique may be added to the options. Alternatively, server 500 may select the method of avoiding contention from among options including not less than two and not more than four techniques of techniques A to E. Alternatively, server 500 may avoid contention by one predetermined technique (for example, any one of techniques A to E) without selecting the method of avoiding contention. When at least three vehicles contend at a certain stand-by point as well, server 500 can avoid contention among all vehicles by avoiding contention for each one vehicle, sequentially from a vehicle later in timing of arrival at the stand-by point with the technique above.

In the embodiment, a robotaxi vehicle without a driver is exemplified as vehicle 1. The robotaxi vehicle performs operation in accordance with the operation plan by automated driving when it receives the operation instruction (S15 in FIG. 9) from server 500. Vehicle 1, however, is not limited to the robotaxi vehicle. Vehicle 1 may be configured such that a driver performs operation in accordance with the operation plan. For example, when vehicle 1 receives the operation instruction from server 500, it may show contents of the operation instruction on a vehicle-mounted HMI (for example, NAVI 170). The driver may perform operation in accordance with the operation plan while the driver checks the operation plan on the vehicle-mounted HMI. Traveling at a vehicle speed as designated by server 500, however, is accurately achieved more readily by automated driving than by manual driving.

The configuration of the vehicle is not limited to the configuration (see FIGS. 1 to 3) described in the embodiment. The base vehicle may perform the automated driving function without subsequent attachment. The level of the automated driving may be full vehicle autonomy (level 5) or conditional vehicle autonomy (for example, level 4). The configuration of the vehicle may be modified as appropriate to a configuration dedicated for traveling without human intervention. For example, a vehicle dedicated for traveling without human intervention does not have to include a component (a steering wheel or the like) for a human to operate a vehicle.

In the embodiment, the plurality of vehicles that receive the instruction from server 500 are similarly configured. Without being limited as such, the plurality of vehicles managed by server 500 may differently be configured. The plurality of vehicles may include at least one type of an xEV (an HEV and a PHEV) including an internal combustion engine, an FCEV, and an internal combustion vehicle without an electric motor for traveling, instead of or in addition to the BEV not including the internal combustion engine. The vehicle is not limited to a passenger car but may be a bus or a truck. The vehicle may be a multi-purpose vehicle customized depending on a purpose of use by a user. Instead of a vehicle, a movable body other than the vehicle (a rail car, a ship, an airplane, a walking robot, a robot cleaner, a drone, a space craft, or the like) may be adopted. The movable body may be configured as being remotely controllable. Any location where a movable body can stand by can be adopted as the stand-by point.

The task is not limited either to transport described previously. Any task executable by the movable body is applicable. For example, the task may be a movable shop, a movable office, or a movable hospital (medical task).

The embodiment and the modifications described above may be carried out as being freely combined.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A server that manages a plurality of movable bodies, wherein the server is configured to generate an operation plan of each of the plurality of movable bodies and to instruct each of the plurality of movable bodies to operate in accordance with the generated operation plan, the operation plan includes a non-service section, a first service section, and a second service section, the non-service section being a section having at least one stand-by point where a movable body of the plurality of movable bodies stands by after the movable body performs a requested task in the first service section and before a new requested task is performed in the second service section, the first service correspond to a section in the operation plan where the at least one movable body of the plurality of movable bodies performs the task and the second service sections correspond to a section in the operation plan where the at least one movable body of the plurality of movable bodies performs the new requested task, the operation plan further having a stand-by period at the stand-by point, and the server is configured to determine, before the server instructs each of the plurality of movable bodies to operate, whether contention will occur, the contention referring to the plurality of movable bodies standing by at an identical stand-by point at identical timing if the server instructs each of the plurality of movable bodies to operate in accordance with the operation plan, and modify the operation plan of at least one of contending movable bodies of the plurality of movable bodies to avoid the contention when the server determines that the contention will occur, wherein in response to the instruction to operate in accordance with the operation plan, at least one of the plurality of movable bodies departs from the stand-by point.

2. The server according to claim 1, configured to change the stand-by point to avoid the contention in the operation plan of at least one of the contending movable bodies.

3. The server according to claim 1, wherein each of the plurality of movable bodies is an automated-driving vehicle, the operation plan further includes a path and a travel condition for movement of the automated-driving vehicle to the stand-by point after end of the task, and the server is configured to, in response to determination that a first movable body and a second movable body of the plurality of movable bodies will contend at the stand-by point, delay in the operation plan of the second movable body, stand-by start time indicated by the stand-by period at the stand-by point to avoid the contention by changing the travel condition without changing the path, the second movable body being later in the stand-by start time than the first movable body.

4. The server according to claim 1, wherein each of the plurality of movable bodies is an automated-driving vehicle, the operation plan further includes a path for movement of the automated-driving vehicle to the stand-by point after end of the task, and the server is configured to, in response to determination that a first movable body and a second movable body of the plurality of movable bodies will contend at the stand-by point, delay in the operation plan of the second movable body, stand-by start time indicated by the stand-by period at the stand-by point to avoid the contention by changing the path to a detour path, the second movable body being later in the stand-by start time than the first movable body.

5. The server according to claim 1, wherein each of the plurality of movable bodies is an automated-driving vehicle, the operation plan further includes a path for movement of the automated-driving vehicle to the stand-by point after end of the task, and the server is configured to, in response to determination that a first movable body and a second movable body of the plurality of movable bodies will contend at the stand-by point, delay in the operation plan of the second movable body, stand-by start time indicated by the stand-by period at the stand-by point to avoid the contention by changing the path to include a loop path including a prescribed number of laps, the second movable body being later in the stand-by start time than the first movable body.

6. The server according to claim 1, wherein the server is configured to select, when there are a plurality of operation plans that allow avoidance of the contention, an operation plan highest in energy efficiency from among the plurality of operation plans.

7. The server according to claim 1, wherein the server is configured to modify, when the server determines that the contention between a first movable body and a second movable body included in the plurality of movable bodies will occur, the operation plan of at least one of the first movable body and the second movable body such that the first movable body and the second movable body are replaced with each other at the stand-by point.

8. An operation system comprising:

the server according to claim 1; and the plurality of movable bodies that receive an instruction from the server.

9. The operation system according to claim 8, wherein the plurality of movable bodies include a first movable body and a second movable body, and in response to an instruction to operate in accordance with the operation plan including scheduled replacement between the first movable body and the second movable body at the stand-by point, the first movable body departs from the stand-by point when the second movable body approaches while the first movable body stands by at the stand-by point.

\* \* \* \* \*